US012633138B2

(12) United States Patent
Huizen et al.

(10) Patent No.: US 12,633,138 B2
(45) Date of Patent: May 19, 2026

(54) VEHICULAR MONITORING SYSTEM

(71) Applicant: Magna Mirrors of America, Inc.,
Holland, MI (US)

(72) Inventors: Gregory A. Huizen, Hudsonville, MI
(US); Justin E. Sobecki, Rockford, MI
(US)

(73) Assignee: Magna Mirrors of America, Inc.,
Holland, MI (US)

( * ) Notice: Subject to any disclaimer, the term of this
patent is extended or adjusted under 35
U.S.C. 154(b) by 66 days.

(21) Appl. No.: 18/413,302

(22) Filed: Jan. 16, 2024

(65) Prior Publication Data

US 2024/0242513 A1     Jul. 18, 2024

Related U.S. Application Data

(60) Provisional application No. 63/582,014, filed on Sep.
12, 2023, provisional application No. 63/515,152,
(Continued)

(51) Int. Cl.
G06V 20/59 (2022.01)
B60R 1/04 (2006.01)
(Continued)

(52) U.S. Cl.
CPC ................ G06V 20/59 (2022.01); B60R 1/04
(2013.01); B60R 1/12 (2013.01); B60R 1/29
(2022.01);
(Continued)

(58) Field of Classification Search
CPC ...... B60K 2370/176; B60K 2370/1868; B60K
2370/21; B60K 2370/52; B60K 2370/797;
(Continued)

(56) References Cited

U.S. PATENT DOCUMENTS

| | | | | |
|---|---|---|---|---|
| 4,733,956 A | * | 3/1988 | Erickson ................. | B60R 1/008 |
| | | | | 248/467 |
| 5,576,898 A | * | 11/1996 | Rubin ..................... | B60R 1/008 |
| | | | | 359/872 |
| 6,822,673 B1 | * | 11/2004 | Kelly ...................... | B60R 1/008 |
| | | | | 348/148 |
| 7,914,187 B2 | | 3/2011 | Higgins-Luthman et al. | |
| 9,405,120 B2 | | 8/2016 | Graf et al. | |

(Continued)

FOREIGN PATENT DOCUMENTS

WO        2023220222 A1    11/2023

*Primary Examiner* — Nathnael Aynalem
(74) *Attorney, Agent, or Firm* — HONIGMAN LLP

(57) ABSTRACT

A vehicular cabin monitoring system includes a camera
disposed at an interior cabin of a vehicle and viewing at least
the head of a driver of the vehicle. A first subset of image
data captured by the camera is representative of the head of
the driver and is processed for monitoring the driver. A
plurality of spectrally reflecting mirror elements are dis-
posed within the interior cabin of the vehicle and spectrally
reflect light toward the camera representative of at least a
portion of light incident at respective obstructed regions
within the interior cabin that are remote from the head of the
driver and not directly viewed by the camera. A second
subset of the image data is representative of light reflected
from at least one spectrally reflecting mirror element. Based
on processing the second subset of image data, the system
determines presence of an object within a respective
obstructed region.

28 Claims, 17 Drawing Sheets

Related U.S. Application Data filed on Jul. 24, 2023, provisional application No. 63/510,934, filed on Jun. 29, 2023, provisional application No. 63/480,307, filed on Jan. 18, 2023.

(51) Int. Cl.

| | |
|---|---|
| *B60R 1/12* | (2006.01) |
| *B60R 1/29* | (2022.01) |
| *B60R 11/00* | (2006.01) |
| *B60R 11/04* | (2006.01) |
| *G06V 10/141* | (2022.01) |
| *G06V 10/26* | (2022.01) |
| *G06V 10/60* | (2022.01) |
| *G06V 40/16* | (2022.01) |

(52) U.S. Cl.
    CPC ............ *B60R 11/04* (2013.01); *G06V 10/141* (2022.01); *G06V 10/26* (2022.01); *G06V 10/60* (2022.01); *G06V 40/161* (2022.01); *B60R 2001/1253* (2013.01); *B60R 2011/0085* (2013.01)

(58) Field of Classification Search
    CPC .............. B60K 35/00; B60K 2370/152; B60K 2370/1526; B60K 2370/1529; B60K 2370/1531; B60K 2370/1533; B60K 2370/736; B60K 2370/739; B60R 1/00; B60R 2300/70; B60R 2300/80; B60R 2300/802; B60R 11/04; B60R 2001/1215; B60R 11/0235; B60R 2011/0276; B60R 2300/205; B60R 1/22; B60R 1/23; B60R 2300/8046; B60R 2300/20; B60R 2300/202; B60R 2011/0028; B60R 2011/0082; B60R 2011/0092; B60R 2011/0084; B60R 11/02; B60R 25/31; B60R 1/008; B60R 1/08; B60R 1/006; B60R 1/04; B60R 1/12; B60R 1/29; B60R 2001/1253; B60R 2011/0085; B60R 2001/1238; B60R 1/24; B60R 1/25; B60R 1/26; B60R 1/27; B60R 1/28; H04N 7/181; G02B 27/01; G02B 27/0093; G05B 2219/35503; G06F 3/012; G06V 20/593; G06V 20/597; G06V 10/141; G06V 10/26; G06V 10/60; G06V 20/59; G06V 40/161
    USPC ........................................................ 348/148
    See application file for complete search history.

(56)                References Cited

U.S. PATENT DOCUMENTS

| | | | |
|---|---|---|---|
| 10,017,114 B2 | 7/2018 | Bongwald | |
| 10,046,706 B2 | 8/2018 | Larson et al. | |
| 10,065,574 B2 | 9/2018 | Tiryaki | |
| 10,324,297 B2 | 6/2019 | Kunze | |
| 10,442,360 B2 | 10/2019 | LaCross et al. | |
| 10,958,830 B2 | 3/2021 | Koravadi | |
| 11,465,561 B2 | 10/2022 | Peterson et al. | |
| 11,518,401 B2 | 12/2022 | Kulkarni | |
| 11,582,425 B2 | 2/2023 | Liu | |
| 11,639,134 B1 | 5/2023 | Huizen et al. | |
| 11,648,956 B2 | 5/2023 | Caron et al. | |
| 11,780,372 B2 | 10/2023 | Sobecki et al. | |
| 11,827,153 B2 | 11/2023 | Miller et al. | |
| 2006/0186651 A1* | 8/2006 | Aoki | B60R 21/01538 |
| | | | 280/735 |
| 2007/0273764 A1* | 11/2007 | Yamada | B60R 1/23 |
| | | | 348/148 |
| 2015/0009010 A1 | 1/2015 | Biemer | |
| 2015/0015710 A1 | 1/2015 | Tiryaki | |
| 2015/0022664 A1 | 1/2015 | Pflug et al. | |
| 2015/0092042 A1 | 4/2015 | Fursich | |
| 2015/0232030 A1 | 8/2015 | Bongwald | |
| 2015/0294169 A1 | 10/2015 | Zhou et al. | |
| 2015/0296135 A1 | 10/2015 | Wacquant et al. | |
| 2015/0352953 A1 | 12/2015 | Koravadi | |
| 2016/0137126 A1 | 5/2016 | Fursich et al. | |
| 2016/0209647 A1 | 7/2016 | Fursich | |
| 2017/0217367 A1 | 8/2017 | Pflug et al. | |
| 2017/0274906 A1 | 9/2017 | Hassan et al. | |
| 2018/0222414 A1 | 8/2018 | Ihlenburg et al. | |
| 2018/0231976 A1 | 8/2018 | Singh | |
| 2019/0118717 A1 | 4/2019 | Blank et al. | |
| 2019/0210615 A1 | 7/2019 | Caron et al. | |
| 2020/0143560 A1 | 5/2020 | Lu et al. | |
| 2020/0202151 A1 | 6/2020 | Wacquant | |
| 2020/0320320 A1 | 10/2020 | Lynam | |
| 2020/0346602 A1* | 11/2020 | Yokoi | B60R 21/01538 |
| 2021/0155167 A1 | 5/2021 | Lynam et al. | |
| 2021/0162926 A1 | 6/2021 | Lu | |
| 2021/0213879 A1* | 7/2021 | Sedaghat Amoli | G06F 3/0487 |
| 2021/0245662 A1 | 8/2021 | Blank et al. | |
| 2021/0291739 A1 | 9/2021 | Kasarla et al. | |
| 2021/0323473 A1 | 10/2021 | Peterson et al. | |
| 2022/0242438 A1 | 8/2022 | Sobecki et al. | |
| 2022/0254132 A1 | 8/2022 | Rother | |
| 2022/0377219 A1 | 11/2022 | Conger et al. | |
| 2023/0377352 A1* | 11/2023 | Rehfeld | G06V 10/14 |
| 2024/0064274 A1 | 2/2024 | Blank et al. | |
| 2024/0168355 A1 | 5/2024 | Baur | |
| 2024/0190456 A1 | 6/2024 | P et al. | |
| 2024/0233511 A1 | 7/2024 | Golbon Haghighi et al. | |
| 2024/0383406 A1 | 11/2024 | Sobecki | |

\* cited by examiner

VEHICULAR MONITORING SYSTEM

CROSS REFERENCE TO RELATED APPLICATIONS

The present application claims priority of U.S. provisional application Ser. No. 63/582,014, filed Sep. 12, 2023, U.S. provisional application Ser. No. 63/515,152, filed Jul. 24, 2023, U.S. provisional application Ser. No. 63/510,934, filed Jun. 29, 2023, and U.S. provisional application Ser. No. 63/480,307, filed Jan. 18, 2023, which are hereby incorporated herein by reference in their entireties.

FIELD OF THE INVENTION

The present invention relates generally to the field of driver monitoring systems or occupant monitoring systems or cabin monitoring systems for vehicles.

BACKGROUND OF THE INVENTION

Integration of a camera behind glass of a rearview mirror can result in visibility limitations due to the camera field-of-view and perspective. In some scenarios, it can be difficult to capture perspectives, such as hands on a steering wheel, holding objects near the steering wheel or lower, passengers or car seats in a front passenger seat, etc. Seats can obstruct vision of footwells behind the front row seats and thus make it difficult to detect scenarios like a small child climbing into the car and in the footwell area.

SUMMARY OF THE INVENTION

The present invention provides a vehicular cabin monitoring system that includes a camera disposed at an interior of a vehicle equipped with the vehicular cabin monitoring system (such as at an interior rearview mirror assembly of the vehicle). The camera views at least a portion of a cabin of the vehicle and is operable to capture image data. An electronic control unit (ECU) includes electronic circuitry and associated software and includes an image processor for processing image data captured by the camera. A plurality of mirrors are disposed within the interior of the vehicle. The camera views the plurality of mirrors, and images reflected off the plurality of mirrors provide views to the camera of obstructed areas in the cabin of the vehicle. Image data captured by the camera is processed at the ECU to determine objects present within the obstructed areas in the cabin of the vehicle.

These and other objects, advantages, purposes and features of the present disclosure will become apparent upon review of the following specification in conjunction with the drawings.

DESCRIPTION OF THE PREFERRED EMBODIMENTS

Figure 1:
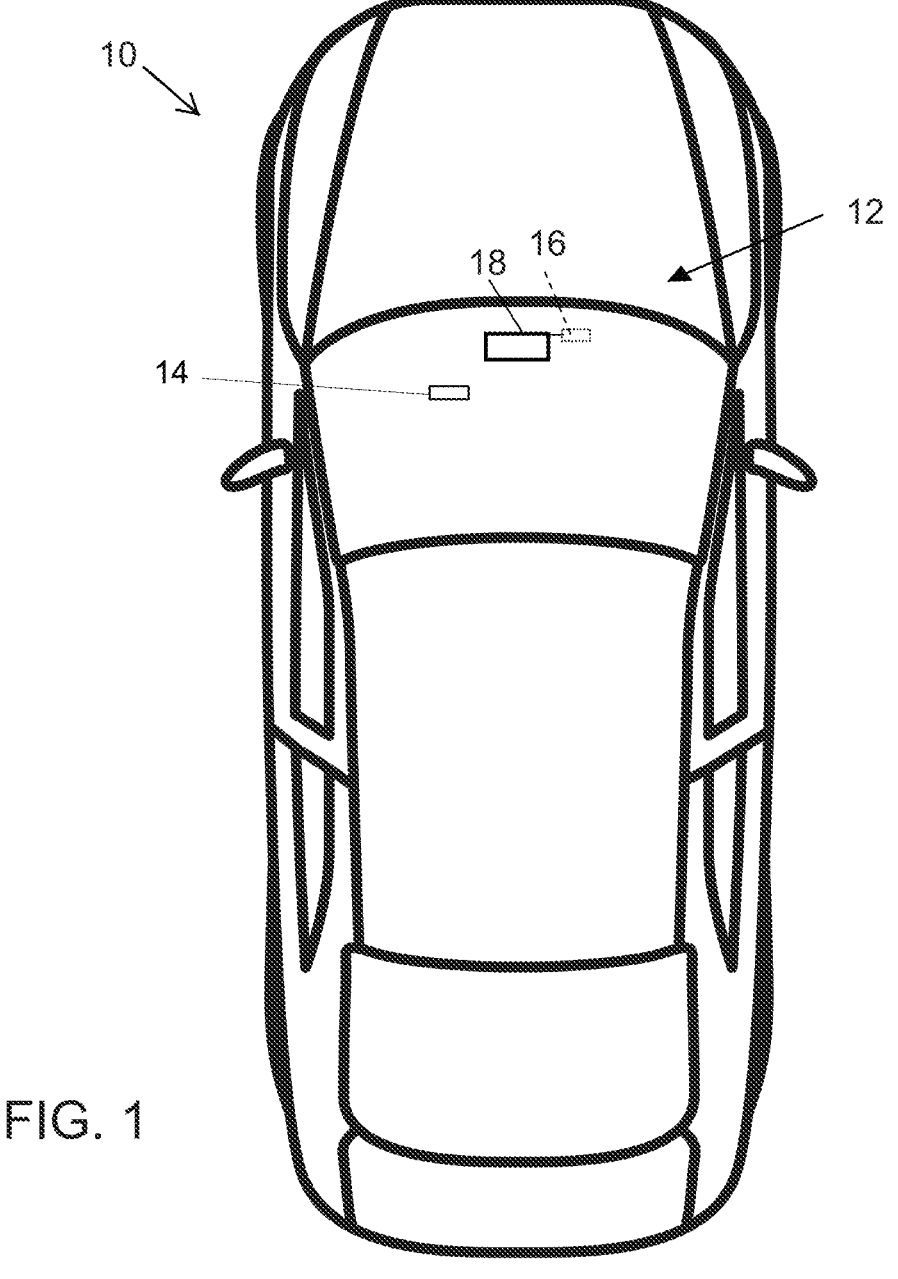
FIG. 1 is a plan view of a vehicle with a monitoring system that incorporates cameras and mirrors.
Figure 2:
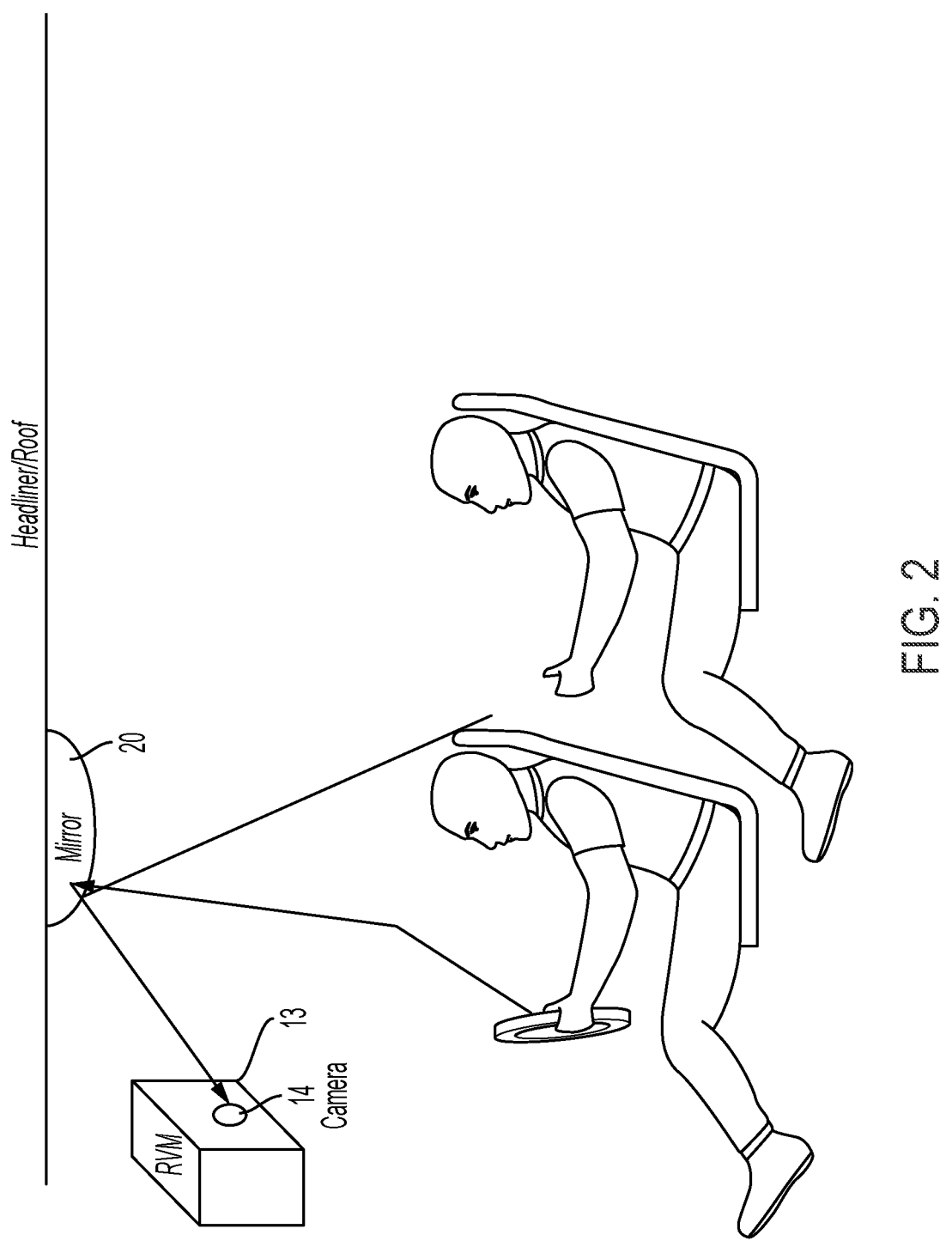
FIG. 2 is a schematic of a monitoring system with a mirror positioned on a headliner and reflecting an object image data to a camera of the monitoring system.

Referring now to the drawings and the illustrative embodiments depicted therein, a vehicle 10 includes a monitoring system 12 that includes at least one interior viewing imaging sensor or camera 14, with the camera having a lens for focusing images at or onto an imaging array or imaging plane or imager of the camera 14 (FIG. 1). The monitoring system 12 may be positioned within an interior rearview mirror 13 of the vehicle 10, such that the camera 14 is disposed within the rearview mirror 13 (FIG. 2). The camera 14 may utilize an anamorphic or freeform camera lens, which can be used to distort the captured image and which can effectively increase pixel density of the images at the location(s) of the imager that sense the mirror reflector(s). The system 12 includes a control or electronic control unit (ECU) 16 that includes electronic circuitry and associated software, with the electronic circuitry including a data processor or image processor that is operable to process image data captured by the camera or cameras 14 (and may process image data captured by other cameras at the vehicle, such as exterior viewing cameras disposed at locations so as to have respective fields of view exterior of the vehicle 10) and/or may provide an output to a display device 18 for displaying video images for viewing by the driver of the vehicle. The data transfer for signal communication from the camera to the ECU 16 may include any suitable data or communication link, such as a vehicle network bus or the like of the equipped vehicle 10.

The system includes one or more mirrors or reflectors or spectrally reflecting mirror elements disposed in the cabin of the vehicle so that the monitoring camera 14 views at least a portion of the cabin that includes the one or more reflectors and captures image data representative of areas of interest such as, for example, the driver's head, placement of the driver's hands on or around the steering wheel, objects in a rear foot well, front seat passengers and/or objects in or around the front seat. That is, the monitoring camera 14 views the areas of interest directly and/or the monitoring camera 14 views reflections of the areas of interest via the one or more reflectors. In some examples, the system 12 may track the head and eyes of the driver of the vehicle 10, such that placement of the monitoring camera 14 may be positioned directly in front of the driver and at or below a line-of-sight of the road. The positioning of the monitoring camera 14 may obstruct a direct-line of view to a front passenger seat of the vehicle 10 and/or areas behind the front seating row, such as rear footwells. Referring to FIG. 2, the monitoring system 12 includes at least one mirror or reflecting element or reflective element 20 positioned within the cabin of the vehicle 10 to assist the monitoring camera 14 in monitoring areas within the cabin that may be obstructed from the direct-line of view with the camera 14. The at least one mirror or reflective element 20 reflects at least a portion of visible light and/or infrared or near infrared light incident threat toward the camera 14 so that the camera 14 captures image data that includes data representative of the light reflected from the at least one mirror 20. Optionally, the system may include a plurality of mirrors or reflective elements disposed at various fixed locations within the cabin of the vehicle to provide a reflected image of those obstructed areas or objects to the monitoring system 12.

For example, and such as shown in FIG. 2, the mirror 20 is positioned at a headliner or roof of the vehicle cabin so that light reflected off objects at a rear seating area may be viewed by the camera viewing the mirror 20. Optionally, another mirror may be positioned on a seat headrest on the front seat (such as at a side portion of the headrest and oriented so as to reflect images from the rear footwell toward the camera) to reflect objects that may otherwise be obstructed by the front seat. The camera 14 maybe configured to have sufficient resolution to capture enough pixels representative of light reflected in the mirrors 20 to allow algorithm detections to determine a clear image from the reflection in the mirror 20. The mirrors 20 may be flat, convex, or freeform depending on the specific area of interest, such that the mirrors 20 may have any practicable shape to provide sufficient coverage of an obstructed area within the cabin. For example, the mirrors 20 may be integrated into a grab handle area, into dome lights at the cabin roof, a ceiling portion including edges of a moonroof or sunroof or panoramic roof glass openings of the vehicle, vehicle pillars (e.g., at the B-Pillar, C-Pillar and/or D-Pillar of the vehicle), seat headrests, an overhead console and the like.

For example, as shown in FIG. 2, a small convex mirror 20 may be positioned at the overhead console or at the headliner to provide vision to the camera 14 of both hands of the driver at or near or on the steering wheel. The close proximity to the camera 14 is beneficial for resolution of camera 14. Optionally, a larger mirror (having a larger radius of curvature) and/or flat mirror may be used. The placement of the mirror 20, such as at the headliner rearward of the overhead console, may be selected to minimize the visibility or viewability of the mirror 20, such that the location of the mirror 20 may remain relatively hidden from the driver and/or passengers of the vehicle. The mirror or mirrors 20 may be positioned in areas that are unutilized by the camera field-of-view and may also serve as fixed cabin points. The fixed cabin points of the mirror 20 may be utilized for camera-position calibration to fine-tune the image capture by the camera 14 based on the positioning of the mirrors 20. For example, image processing of image data captured by the camera can determine location of the mirrors within the captured image data for determining the position or orientation or angle of the mirror head and can determine and set a pre-saved mirror head position corresponding to the particular driver in the vehicle. Optionally, image processing of image data captured by the camera can determine the driver's eyes location and can thus determine and set the appropriate position of the mirror head for that driver to view rearward through the rear window of the vehicle.

The monitoring system 12 may monitor the driver and/or the passengers of the vehicle as well as the environment within and around the vehicle. The mirrors 20 assist the camera 14 by providing additional views and angles to capture comprehensive image data of an interior of the vehicle. The mirrors 20 minimize obstructions that may otherwise form blind spots for the camera 14 within the interior of the vehicle. The ECU 16 may process the image data received from the camera 14, including the reflected images from the mirrors 20, to assess potential hazards or instances that may warrant a cautionary warning. For example, the monitoring system 12 may process images reflected by the mirror 20 and received by the camera 14 that indicate an object within a footwell of the vehicle, which may prompt the monitoring system 12 to present a notification to the driver, such as in the form of an icon, a message, or any other notification, and optionally containing images generated based on the captured image data.

Figure 3:
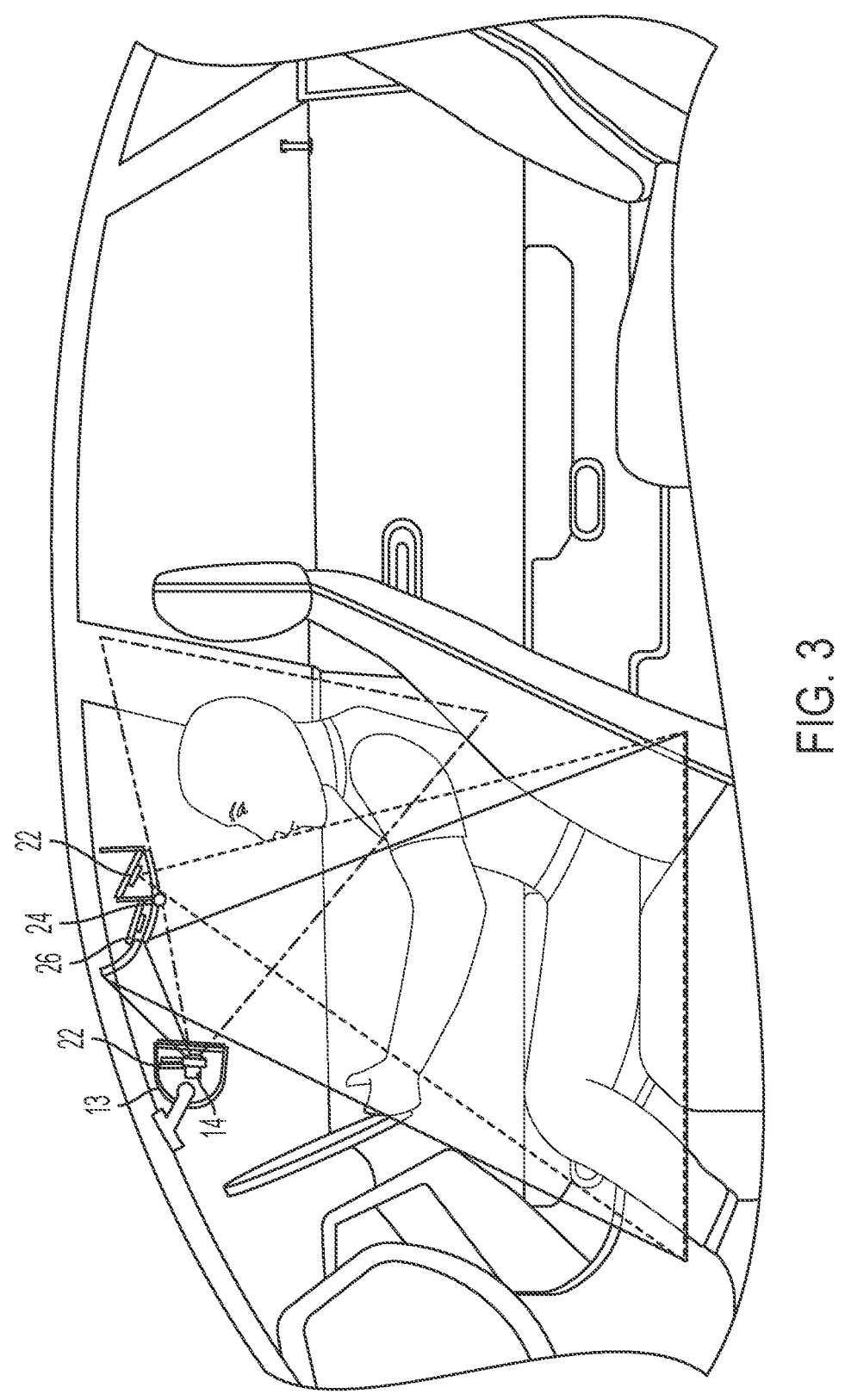
FIGS. 3-5 are additional schematics of the monitoring system with near infrared light emitters disposed at or near the camera and at or near the mirror positioned on the headliner.

Referring to FIG. 3, the system 12 may include one or more infrared light (IR light) emitters or near infrared light (near IR light) emitters 22 that, when electrically powered to emit light, emit IR light or near IR light toward at least a portion of the interior cabin of the vehicle. The camera 14 is thus configured to capture image data representative of the near IR light reflected from surfaces and objects within the interior cabin of the vehicle. Thus, via capture and processing of image data representative of the near IR light, the system 12 is able to monitor the driver and areas of interest within the cabin of the vehicle in low visible light conditions. For example, during nighttime or other low visible light driving conditions, the system 12 may operate the one or more light emitters 22 to illuminate the cabin with near IR light. The system 12 may determine the low visible light condition in any suitable manner, such as based on a signal from an ambient light sensor of the vehicle or based on processing of the captured image data.

At least one of the near IR light emitters 22 may be disposed at the interior rearview mirror assembly 13, such as within the mirror head and emitting near IR light through the mirror reflective element. Thus, the near IR light emitter 22 at the mirror assembly 13 may emit near IR light toward a head region of the driver so that the camera 14 at the mirror assembly 13 may capture image data representative of the near IR light reflected from the head region of the driver to view the head region of the driver (such as for a DMS (driver monitoring system) or OMS (occupant monitoring system) and tracking a gaze of the driver, tracking a head position of the driver and the like).

Further, the near IR light emitter 22 at the mirror assembly 13 may emit near IR light toward the remote mounted field of view extender or mirror or reflective element 20 mounted at the headliner of the vehicle so that near IR light may be reflected from the mirror 20 and directed toward other regions of the cabin, such as a hand region of the driver at or near the steering wheel, a foot well of the cabin, a leg or seat position of the driver (such as for determining posture of the driver), a rear seat of the cabin (such as for child seat detection) and the like. Thus, the camera 14 at the rearview mirror 13 may have a field of view at least partially downward by viewing reflections at the mirror 20 or viewing near IR light reflected from the mirror 20.

Optionally, one or more near IR light emitters 22 (such as two or more near IR light emitters or four or more near IR light emitters) may be disposed at or near the mirror 20 and configured to direct emitted light at least downward toward the driver and/or passenger regions of the vehicle. The near IR light is reflected from the objects or surfaces within the cabin of the vehicle (e.g., the driver's hands, the foot well and the like) and reflected from the mirror 20 to be viewed by the camera 14 at the rearview mirror assembly 13. Optionally, a camera configured to capture image data representative of the near IR light may be disposed at the mirror 20 or rearview mirror assembly 13 for dedicated capture of the near IR light reflected from objects and surfaces within the vehicle cabin. One or more near IR light retroreflectors 24 may be disposed at or near the mirror 20, such as for directing the reflected near IR light toward the camera 14 at the rearview mirror assembly 13. Thus, near IR light may be reflected from objects and surfaces within the cabin of the vehicle toward the retroreflector 24, and the retroreflector 24 may receive and reflect the near IR light toward the camera 14. For example, the retroreflector 24 may direct a focused reflection of the near IR light toward the camera 14.

Moreover, a near IR light photodetector 26 may be disposed at or near the mirror 20 and directed at least partially toward the mirror assembly 13 for detecting near IR light incident at the photodetector 26. When the near IR light photodetector 26 detects near IR light incident thereat (e.g., detects at least a threshold level of near IR light), the near IR light photodetector 26 may trigger operation of the near IR light emitter 22 at or near the mirror 20. Thus, when the near IR light emitter 22 at the mirror assembly 13 is operated by the system 12, the near IR light photodetector 26 may detect the emitted near IR light to begin operating the near IR light emitter 22 at the mirror 20. When the near IR light photodetector 26 stops detecting near IR light (e.g., detects below the threshold level of near IR light), the near IR light emitter 22 at the mirror 20 may stop operating. Therefore, operation of the near IR light emitter 22 at the mirror 20 may be controlled and/or synced with operation of the near IR light emitter 22 at the rearview mirror assembly 13 without communicating signals via communication cables between the rearview mirror assembly 13 and the mirror 20.

Thus, the system 12 includes a mirror or field of view extender 20 mounted remote from the camera 14 at the rearview mirror assembly 13, such as at a headliner of the vehicle. The mirror 20 is mounted at the roof of the cabin to provide reflected views of the driver and/or passenger seat regions of the vehicle, the foot wells, the driver hand region and the like to the DMS and/or OMS camera mounted in the rearview mirror assembly 13. The camera 14 may have a rearward field of view for capturing image data for the DMS and OMS features. The mirror 20 may provide an at least partially downward field of view to the camera 14 for hand tracking, child seat detection, viewing of objects in the foot well, leg and/or seat posture detection and the like. The near IR light emitters 22 may be operated to illuminate the seat regions of the vehicle, the foot well and the driver hand regions.

The near IR light photodetector 26 may be used to sync up operation of the near IR light emitter 22 at the mirror 20 with operation of the near IR light emitter 22 at the mirror assembly 13 and the camera 14. That is, the IR receiver 26 may detect a pulse of IR light from the interior rearview mirror DMS IR LEDs and directly enable the LED driver to operate the near IR light emitters 22 at the reflector 20. For example, if the camera 14 and the near IR light emitter at the mirror assembly 13 is operated for the DMS feature, the near IR light emitter at the reflector 20 may be automatically operated to illuminate portions of the camera's field of view that are viewable via the reflector. Synchronizing the camera 14 and the near IR light emitter 22 at the reflector 20 via the near IR light photodetector 26 may provide a simple and low cost synchronization solution, and there may be no need for communication wires between the modules. The near IR light photodetector 26 maybe optically designed to prevent self-triggering and a trigger delay may be improved with a microcontroller.

Further, the one or more near IR light retroreflectors 24 may be used by a position determining system (utilizing a position determining algorithm that determines position based on one or more sensors, such as magnetic sensors, disposed at the mirror head and/or mounting structure) to detect the interior rearview mirror position or angle or orientation in the vehicle. For example, the retroreflector 24 may direct the reflected near IR light along a known path or angle relative to the position of the retroreflector 24 at the headliner of the vehicle, and based on a position of the detected near IR light in the image data captured by the camera 14, the system determines the position and/or orientation of the camera and/or mirror head. That is, based on the near IR light reflected by the retroreflector 24 toward the camera 14 at the rearview mirror assembly, the system may be able to determine a position or viewing angle of the camera 14 and/or the rearview mirror assembly 13, such as for calibrating the system 12. Optionally, the system could expose the near IR light emitters 22 to the camera.

Thus, the addition of the near IR light emitters make the mirror 20 more useful, such as by increasing visibility of the camera 14 viewing the mirror 20. The near IR light emitter and detector may be positioned in any suitable location in the vehicle to help illuminate in-cabin regions that are remote from (and not directly viewable by) the camera, such as at or near a rear seat position or third row position so that the camera may view passengers in the rear seat position or third row position. For example, two or more near IR light emitters may be disposed at the mirror 20 and two or more near IR light emitters may be disposed rearward of the mirror 20 to illuminate the second row seat position or third row seat position or cargo area of the vehicle cabin.

In some examples, the reflective element 20 may reflect a relatively high portion of near IR light incident thereat, such as 40 percent or more, 50 percent or more, 75 percent or more, 95 percent or more, and the like, and the reflective element 20 may reflect a relatively low portion of visible light incident thereat, such as 40 percent or less, 25 percent or less, 10 percent or less, and the like so that the camera 14 is able to view the near IR light reflected from the reflective element 20 and the reflective element 20 is hidden or rendered covert from view of the occupants of the vehicle.

Figure 4:
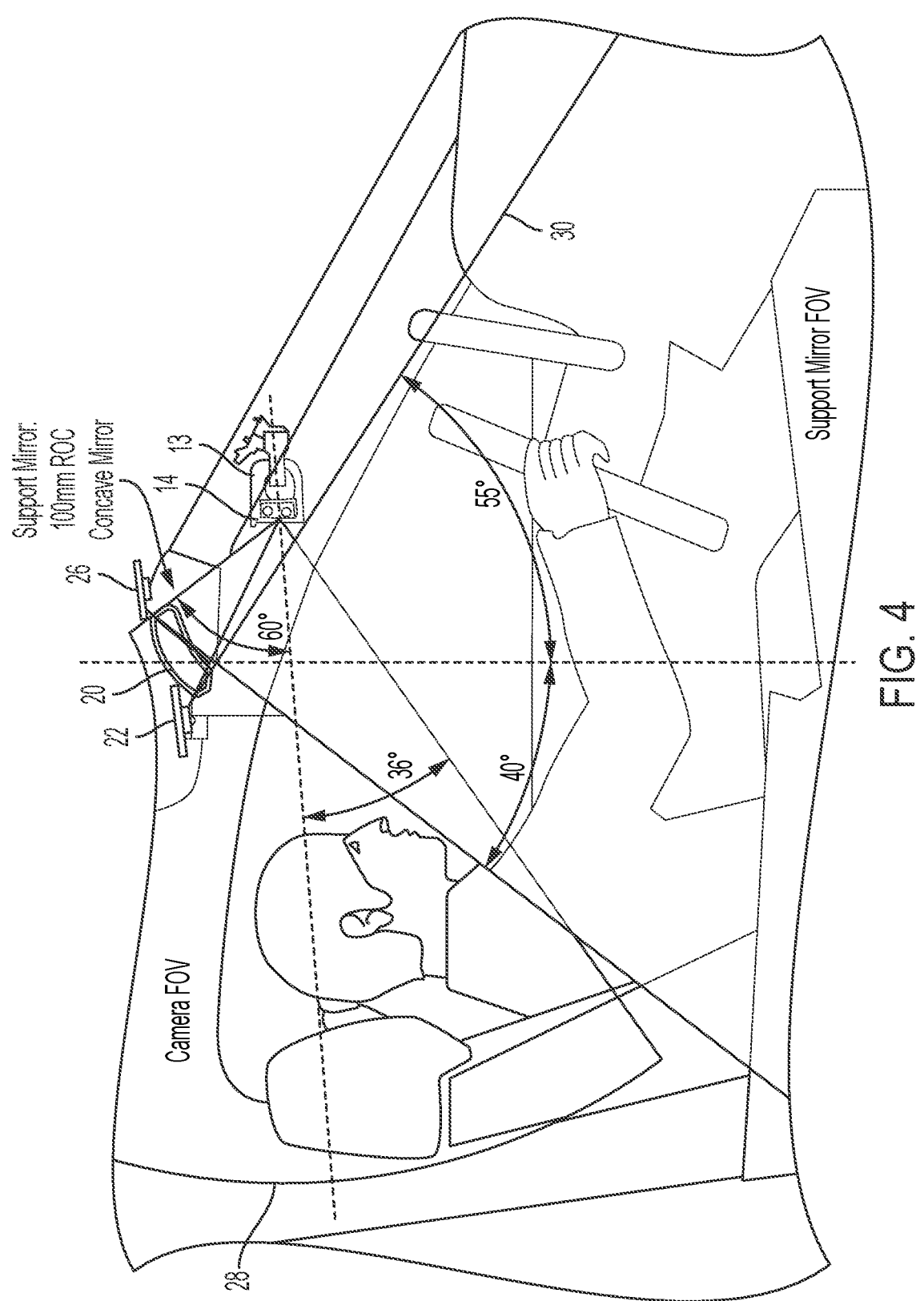
Figure 5:
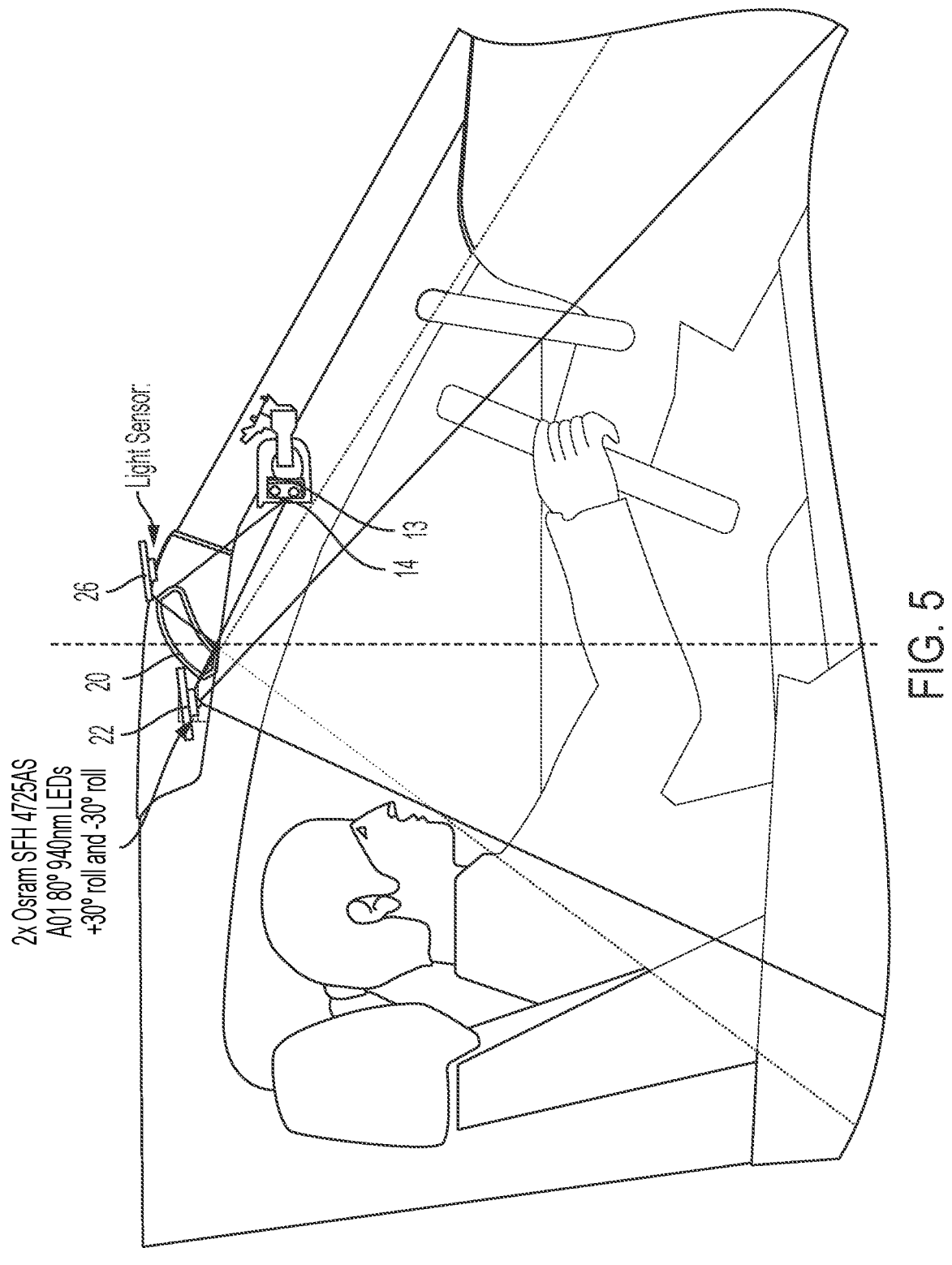

As shown in FIGS. 3-5, the camera 14 may be disposed at the interior rearview mirror assembly 13 and the reflector 20, near IR light emitter 22 and the near IR light photodetector 26 may be disposed at the headliner of the vehicle, with at least the reflector being within the field of view of the camera 14. With the interior rearview mirror assembly 13 positioned by the driver to provide a rearward field of view to the driver, the camera 14 has a primary field of view 28 that includes a head region of the driver so that image data captured by the camera 14 may be processed for the DMS function. However, the field of view of the camera 14 may be limited, such as by the position of the interior rearview mirror assembly 13 and refraction caused by the electrochromic mirror reflective element or prismatic mirror reflective element through which the camera 14 views. For example, the field of view 28 of the camera 14 may not view regions within the vehicle cabin that include the driver's hands (e.g., at the steering wheel or operating the infotainment system at the center console) or portions of the front seat positions (e.g., to view the laps of the passenger or driver and to view the front seat foot wells).

In the illustrated example of FIG. 4, the primary field of view 28 of the camera 14 has a vertical angle of view of about 96 degrees, with a lower portion of the primary field of view 28 viewing the head region of the driver and an upper portion of the primary field of view 28 viewing the reflector 20 at the headliner. The lower portion of the primary field of view 28 may include about 36 degrees of the angle of view and the upper portion may include about 60 degrees of the angle of view.

The reflector 20 is positioned or oriented relative to the camera 14 to reflect images for viewing by the camera that include at least driver hand positions and the front seat positions. Thus, the reflector 20 provides a secondary field of view 30 to the camera 14, where the camera 14 is able to view the secondary field of view 30 via the reflections at the reflector 20. For example, the support mirror 20 may include a concave mirror having a radius of curvature of 100 millimeters with a length of about 153 millimeters and a width of about 102 millimeters. The mirror 20 may provide a secondary field of view 30 directed generally downward from the mirror 20 at the headliner and having an angle of viewing that spans about 95 degrees longitudinally (i.e., in a direction parallel to the longitudinal axis of the vehicle). A forward portion of the secondary field of view 30 may view the driver hand positions and include about 55 degrees of the angle of view. A rearward portion of the secondary field of view 30 may view the front seat positions and include about 40 degrees of the angle of view.

Figures 6, 7:
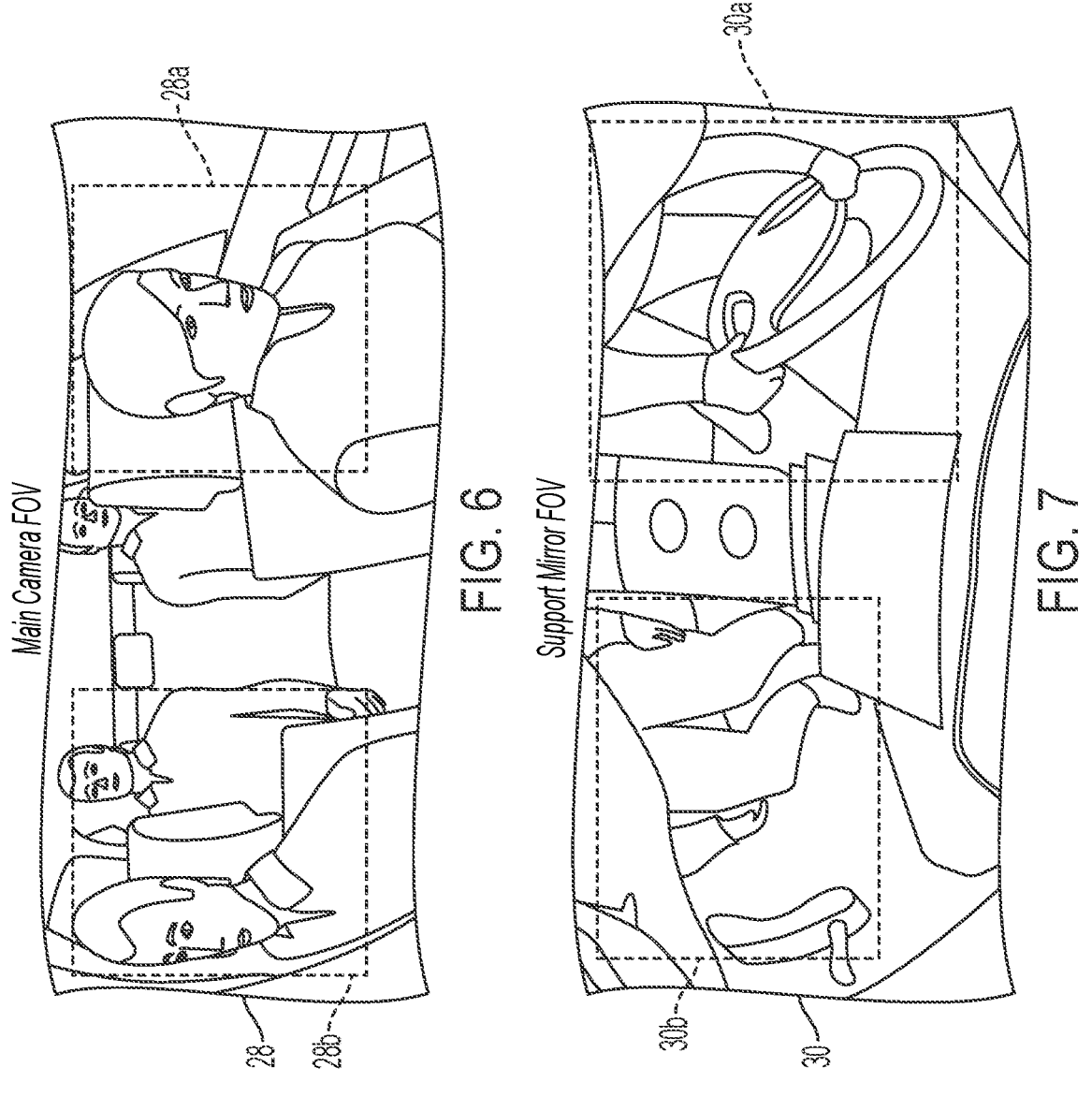
FIG. 6 is a portion of an example image captured by the camera that is representative of a primary field of view of the camera and that includes front row head regions of the interior cabin of the vehicle.
FIG. 7 is a portion of an example image captured by the camera that is representative of a secondary field of view of the camera provided by reflections from the mirror and that includes front row seat regions of the interior cabin of the vehicle.

Thus, a first portion of the image data captured by the camera 14 is representative of the primary field of view 28 (FIG. 6) and a second portion of the image data is representative of the secondary field of view 30 (by viewing reflections provided by the reflector) (FIG. 7). The primary field of view 28 views front row head or upper body regions of the vehicle and thus includes at least a driver head region 28a corresponding to a head position or upper body position of the driver of the vehicle and a passenger head region 28b corresponding to a head position or upper body position of the passenger of the vehicle.

By processing image data captured by the camera 14 and representative of the driver head position 28a in the primary field of view 28, the system may perform driver head and eye and mouth detection and the system may determine a pose of the driver's head and a gaze direction of the driver. Further, the system may perform facial recognition and determine a drowsiness and/or attentiveness level of the driver and determine whether the driver is engaging in microsleep behaviors. Moreover, the primary field of view 28 may allow the system to detect presence of occupants in the passenger seat and image data representative of the primary field of view 28 may be used for video communications or video conferencing.

The secondary field of view 30 includes at least a driver seat region and/or foot well region 30a corresponding to a lower body or foot well position of the driver of the vehicle and a passenger seat region and/or foot well region 30b corresponding to a lower body or foot well position of the passenger of the vehicle. The secondary field of view 30 allows the system to track hand positions for the driver and/or passenger and detect objects in the seat regions and/or foot wells that may cause distracted driving (such as mobile devices).

By processing image data captured by the camera 14 and representative of the reflections at the reflector 20, the system may determine driver hand positions at the steering wheel or operating the infotainment system at the center console. Further, the secondary field of view 30 allows the system to detect presence of objects in the front seat positions, such as in hands or laps of the driver and passenger, perform child and/or child seat detection in the front seat positions and determine posture for the driver and passenger.

To provide additional or supplemental IR illumination for regions within the secondary field of view 30, one or more near IR light emitters 22 are disposed at or near the reflector 20 at the headliner of the vehicle and, when electrically operated, emit near IR light that illuminates regions of the vehicle cabin generally below the near IR light emitters 22, such as the driver hand positions and the front seat positions. For example, respective near IR light emitters 22 may be disposed along opposing sides of the reflector 20, such as to respectively provide near IR illumination of driver seat position and the passenger seat position. The reflector 20 reflects near IR light within the secondary field of view 30 for viewing by the camera 14 at the mirror assembly 13. In other words, adding IR LEDs to either side of the support mirror 20 provides added illumination to aid the IR LEDs in the mirror assembly 13 to illuminate the lap area or the steering wheel.

The near IR light emitters 22 may include any suitable light source for emitting IR light or near IR light, such as light having wavelengths greater than about 800 nanometers, greater than about 900 nanometers, or having wavelengths of about 940 nanometers. For example, the near IR light emitters 22 may include SFH 4725AS A01 IR LEDs commercially available from ams-OSRAM AG of Premstaetten, Austria and having roll of 30 degrees and −30 degrees. The field of illumination of the near IR light emitters may generally correspond to or overlap the secondary field of view 30 provided by the reflector 20 (FIG. 5).

When the near IR light emitters 22 are operated to emit near IR light, the light emitters 22 may be pulsed or operated in short bursts to provide non-continuous IR illumination. Pulsing of the near IR light emitters 22 is synchronized with operation of the camera 14 so that image data captured by the camera 14 is representative of the near IR light emitted by the near IR light emitters and reflected from surfaces and objects within the vehicle. For example, operation of the near IR light emitters 22 may be synchronized with the frame rate of the camera 14 so that the near IR light emitters emit light during capture of image data and the near IR light emitters do not emit light when the camera is between frame capture. Further, the near IR light emitters 22 may only be operated when the DMS is operating based on captured near IR light image data (and the near IR light emitters may not be operated when the DMS is operating based on captured visible light image data), such as to avoid interference of the near IR light with captured visible light image data.

Figure 8:
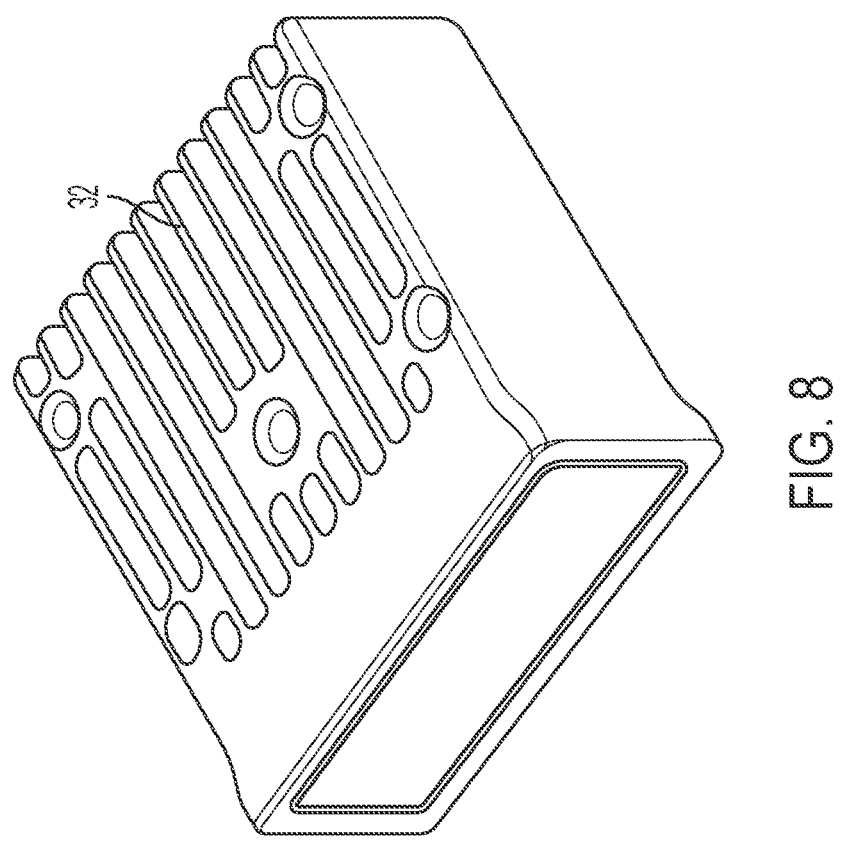
FIGS. 8 and 9 show example control modules for synchronizing operation of the camera and near infrared light emitters remote from the camera.

A discrete flash wire may electrically connect between the mirror assembly 13 and the light emitters 22 at the reflector 20 remote from the mirror assembly 13 for synchronizing operation of the camera 14 at the mirror assembly 13 with light emitters 22 at the reflector 20. The discrete flash wire provides a simple and cost effective synchronization solution. The discrete flash wire may create latency between the synchronization signal and operation of the light emitter, the flash wire may not be immune to electrical noise, and the flash wire provides an additional electrical connection for the vehicle wire harness. For example, and as shown in FIG. 8, a flash control module 32 may be in electrical communication with the camera 14 at the mirror assembly 13 and communicate a signal to the near IR light emitter 22 at the mirror 20 (via the wired connection of the flash wire) to operate the near IR light emitter 22 when the camera 14 is capturing image data representative of near IR light reflected from surfaces and objects within the vehicle.

Figure 9:
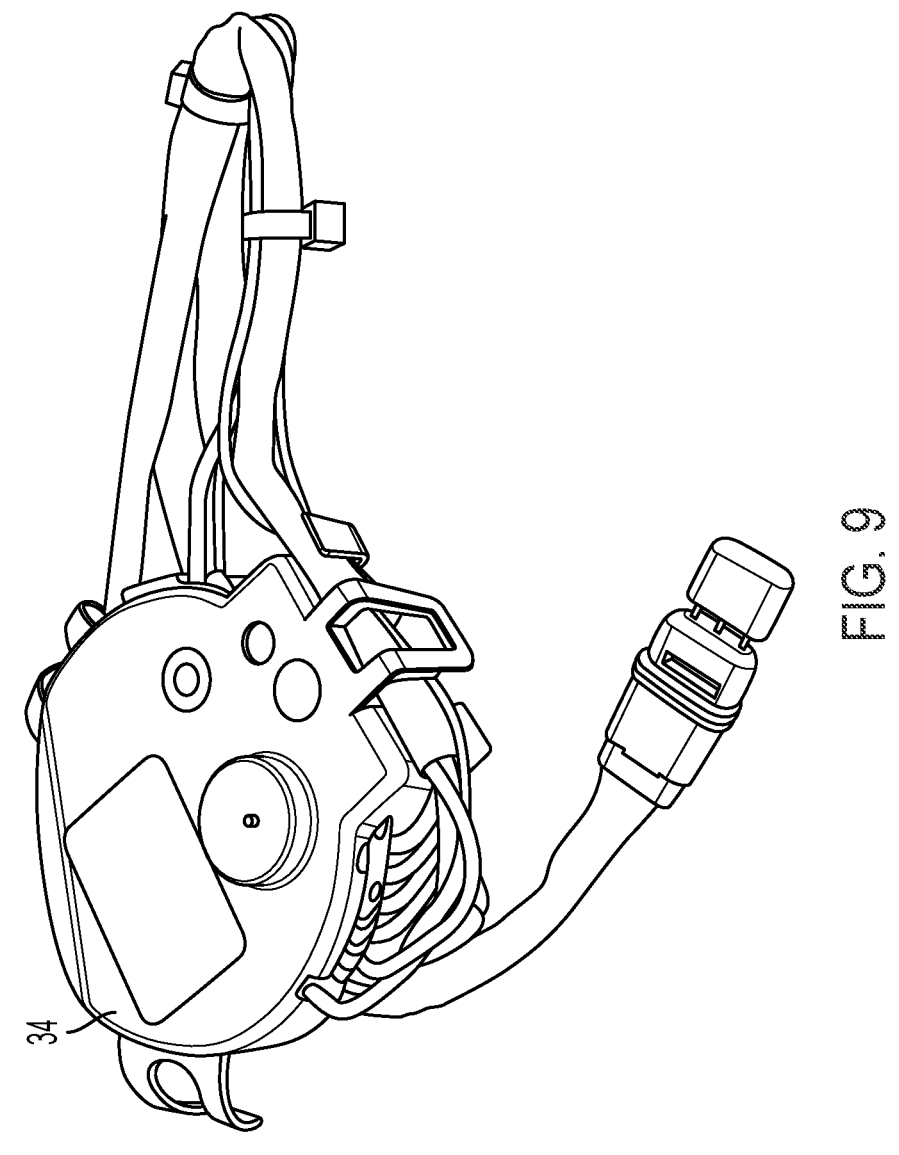

Optionally, a command may be communicated over the LIN or CAN bus of the vehicle for synchronizing operation of the camera 14 and near IR light emitters 22 at the reflector 20. That is, a flash command (or pulse frequency, phase and duration information) may be sent over the CAN or LIN bus. The command communicated over the CAN or LIN bus provides communication between the module at the mirror assembly 13 and the module at the reflector 20 and provides a robust synchronization solution. For example, and as shown in FIG. 9, the command over the CAN or LIN bus may require a complex synchronization routine with an extra microcontroller 34 and hardware to enable the command synchronization.

Figure 10:
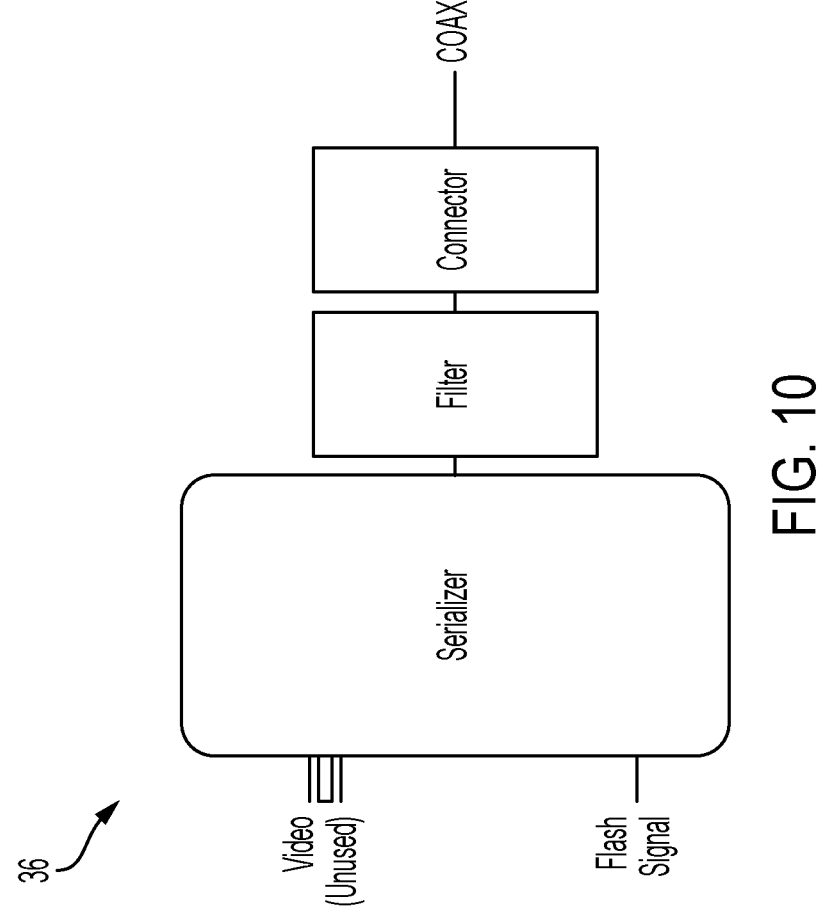
FIG. 10 is a schematic of a coaxial serializer of the camera.

Referring to FIG. 10, a command may be communicated over the serializer-deserializer coaxial connection 36 with the camera 14, where one channel of the connection 36 may carry the captured image data and/or generated video image data and another channel of the connection 36 may carry signals for controlling operation of the near IR light emitter to synchronize the near IR light emitter 22 with operation of the camera 14. In other words, a flash command may be sent over a back-channel of the serializer-deserializer connection 36. The coaxial serializer-deserializer synchronization may fully sync the near IR light emitter to the imager and provide little to no latency. The coaxial serializer-deserializer synchronization may include additional hardware, such as serializer-deserializer IC at the camera and at the near IR light emitter, with coax cables and connectors.

Figure 11:
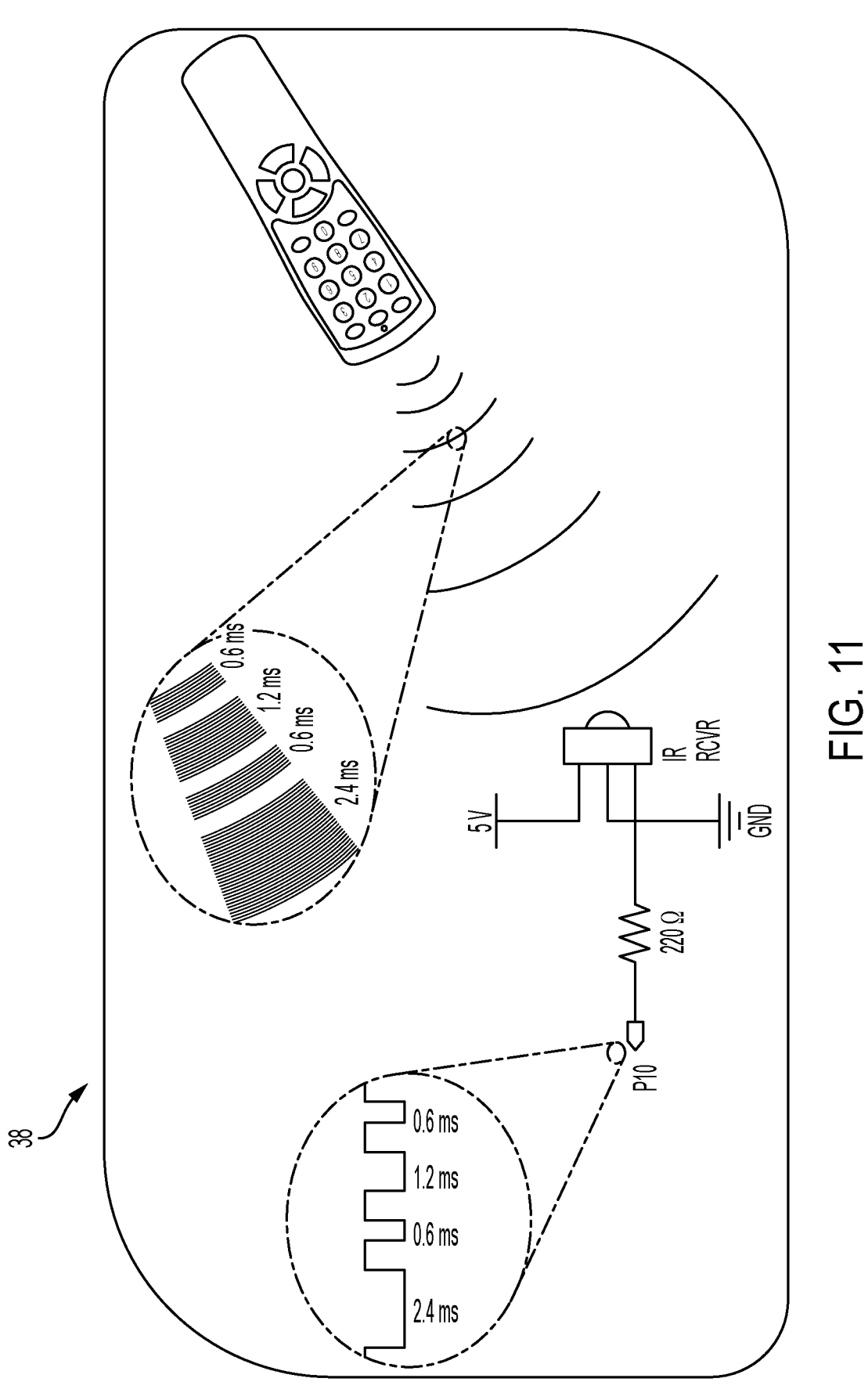
FIG. 11 is a schematic showing remote synchronization of the camera and the near infrared light emitter via infrared control signals.

As shown in FIG. 11, operation of the camera 14 and the near IR light emitter 22 at the reflector 20 may be synchronized via remote control, such as shown in the example diagram 38 that shows transmission between a remote device at the mirror assembly 13 and a receiving antenna at the reflector 20. That is, the IR light receiver or photodetector 26 may detect an IR light pulse from the near IR light emitter 22 at the mirror assembly 13 or a dedicated IR LED and the IR light photodetector 26 may directly enable operation of the LED driver or receive commands from the IR light pulse. Thus, rather than synchronizing the near IR light emitters at the reflector 20 to operate at the same time as the near IR light emitters at the mirror assembly 13, the near IR light emitters at the reflector 20 may be operated in response to a pulse or control signal from the IR LED at the mirror assembly 13. Remote control synchronization may provide a simple and low cost synchronization solution with no need for additional wires connecting between the mirror assembly 13 and the reflector module 20. Remote control synchronization may create latency in operation and the photodetector and IR LEDs may be optically designed to ensure accurate detection and avoid inadvertent activation.

Because irradiance of light or near IR light or IR light drops off further from the light source, illumination of target areas within the vehicle is improved by positioning near IR LEDs closer to the target areas. Thus, additional near IR light emitters may be positioned at or near or directed toward target areas within the vehicle, such as rear seat positions (e.g., second row seat positions or third row seat positions). For example, the near IR light emitters for rear seat position illumination may be disposed at the reflector module 20 or remote from the reflector module 20 elsewhere in the vehicle (such as at or near the vehicle headliner).

Figure 12:
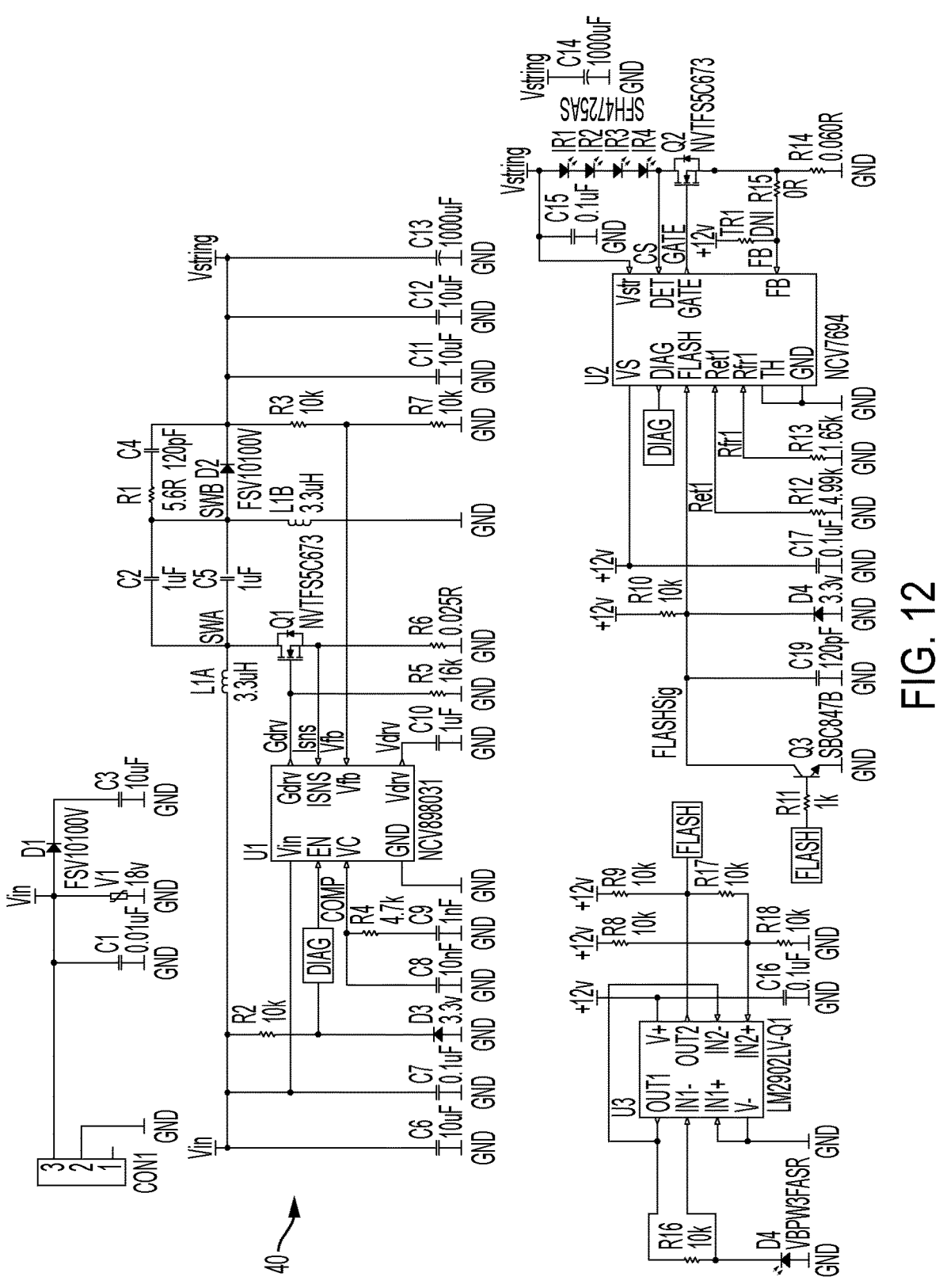
FIG. 12 is an example schematic of the monitoring system.
Figures 13, 14:
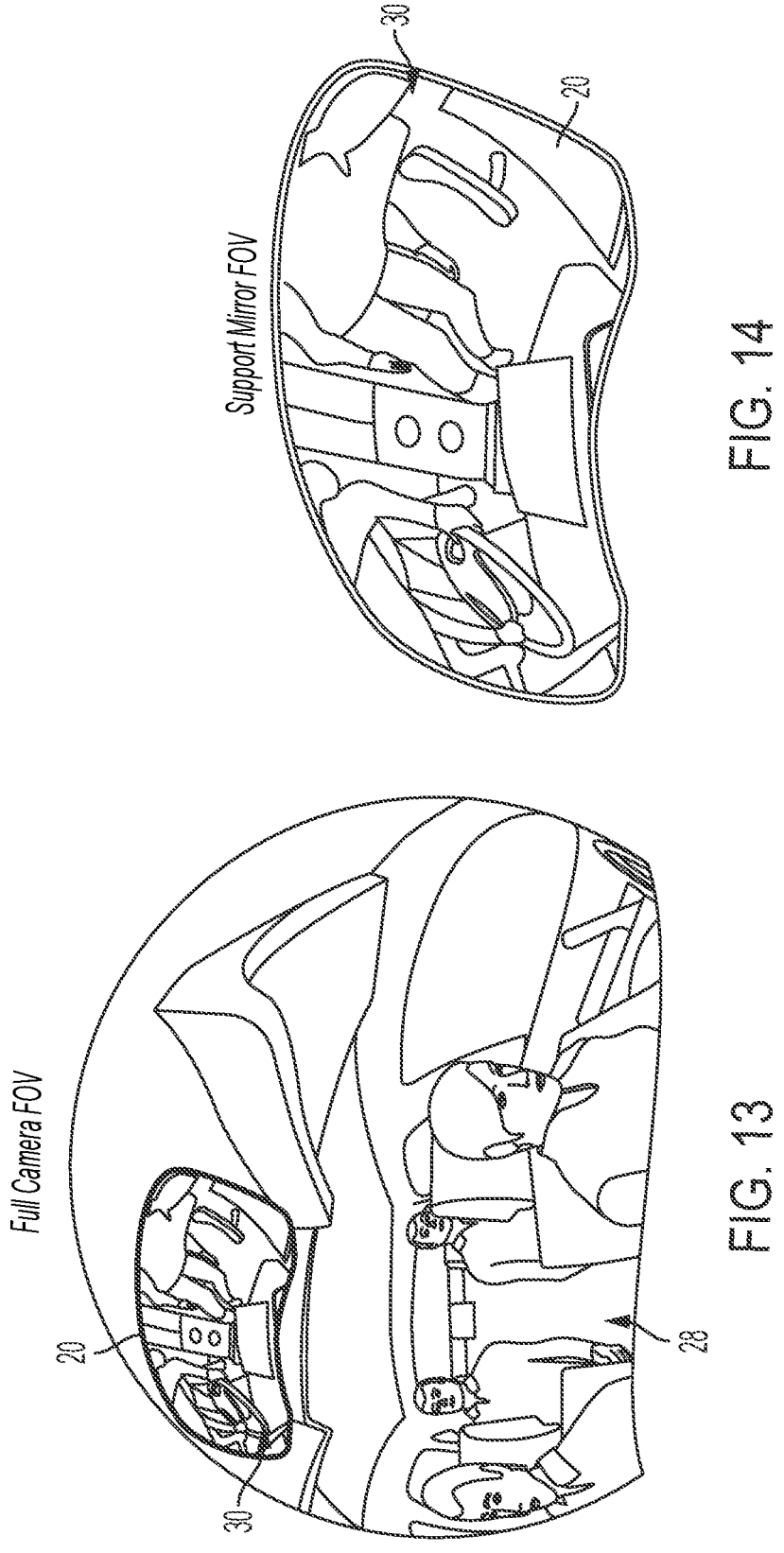
FIG. 13 is an example image captured by the camera of the monitoring system.
FIG. 14 is the secondary field of view provided by the mirror in the example image of FIG. 13.

FIG. 12 depicts an example schematic 40 of the near IR light emitters, the camera, the near IR light photodetector and the like of the system within the vehicle.

Thus, the system includes a camera 14 at the interior rearview mirror assembly 13 and that may optionally view through the mirror reflective element of the mirror assembly 13. One or more near IR light emitters 22 may be disposed at the mirror assembly 13, such as for illuminating a driver head region of the vehicle. A reflector module 20, which may include one or more near IR light emitters 22, may be disposed within the primary field of view 28 of the camera 14 so that the camera 14 may view a secondary field of view 30 via reflections at the reflector 20. Via processing of image data captured by the camera 14, the system may provide a DMS and OMS function for the vehicle with an enhanced field of view provided by the reflector 20 that includes the front seat positions and foot wells and optionally the rear seat positions and foot wells. Thus, the interior rearview mirror assembly with DMS camera and the reflector module provide an enhanced field of view of the cabin while maintaining and enhancing functionality of the DMS and OMS, with a more cost effective solution than adding additional cameras. The module may be integrated with the overhead console module of the vehicle or the headliner of the vehicle.

The system may determine the position of the reflector 20 within the captured image data or portion of the captured image data that includes reflections from the reflector 20 and process the determined portion to view the driver hand positions and front seat positions and foot wells. For example, the reflector 20 may include a trim piece or border circumscribing an edge of the mirror and the system may detect the border and process images within the border. The reflector may use about 0.4 megapixels of a 5 megapixel imager.

Figure 15:
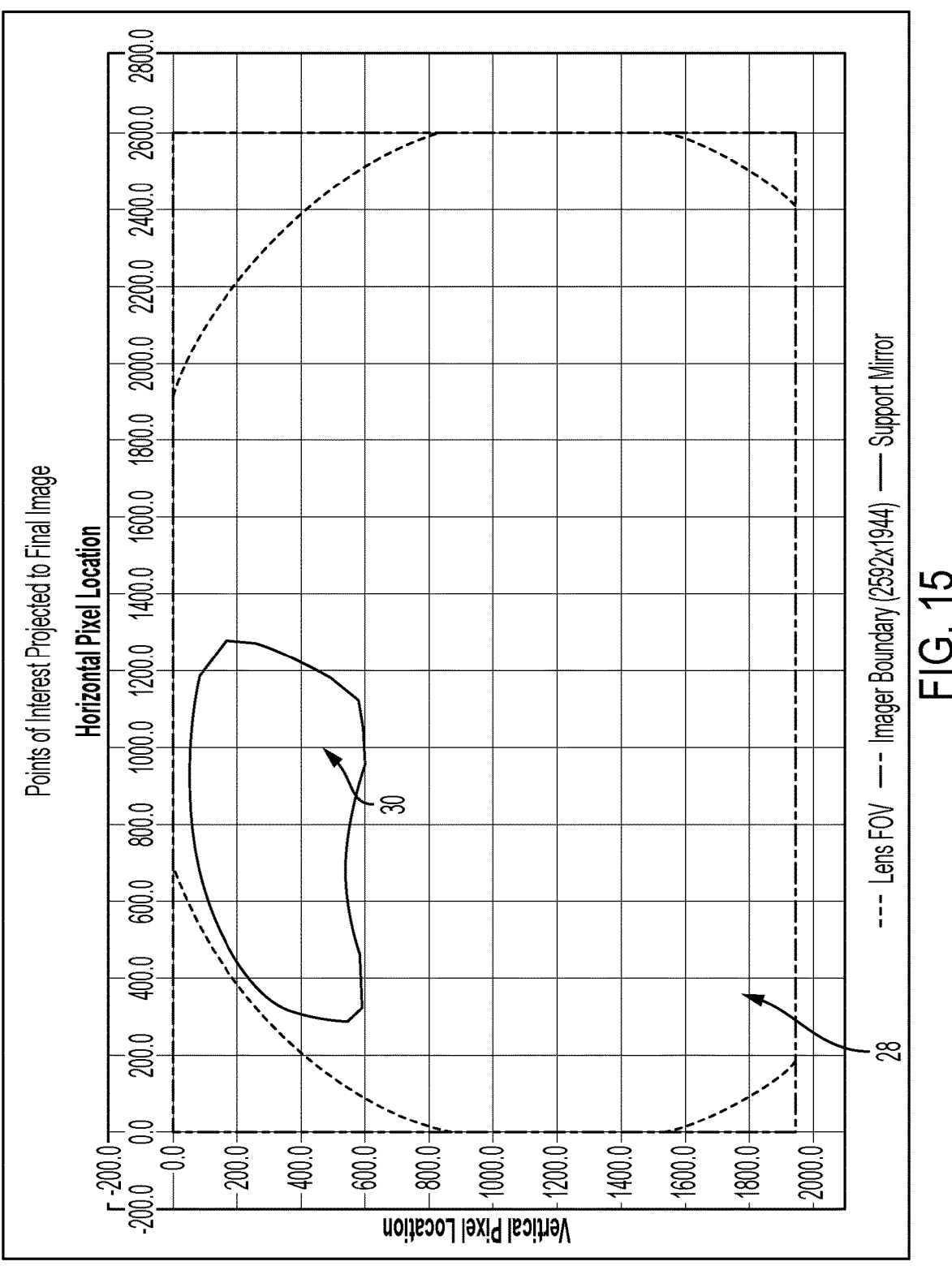
FIG. 15 is an example diagram showing the portion of the field of view of the camera taken up by the mirror in the image of FIG. 13.

Referring to FIGS. 13-17, because the mirror 20 is within the primary field of view 28 of the camera 14, images captured by the camera 14 include the primary field of view 28 (i.e., the head regions of the driver and passenger) and the secondary field of view 30 (i.e., the reflections provided by the mirror 20). The cabin monitoring system may process the first portion of the image data for determinations related to the driver head region (e.g., gaze direction, driver awareness and the like) and may process the second portion of the image data for determinations related to the seat positions (e.g., object detection in the foot wells, hand positions of the driver and the like). The second portion may for example, account for about 0.4 megapixels of 5 megapixels (less than 10 percent and greater than 5 percent, such as about 8 percent) of the camera field of view (FIG. 15). In other words, the camera includes an imaging array having at least one million photosensors (i.e., a one megapixel imaging array), such as five million photosensors or more, and the second portion of the image data may correspond to less than 10 percent of the imaging array, such as 8 percent or less of the imaging array.

Figure 16:
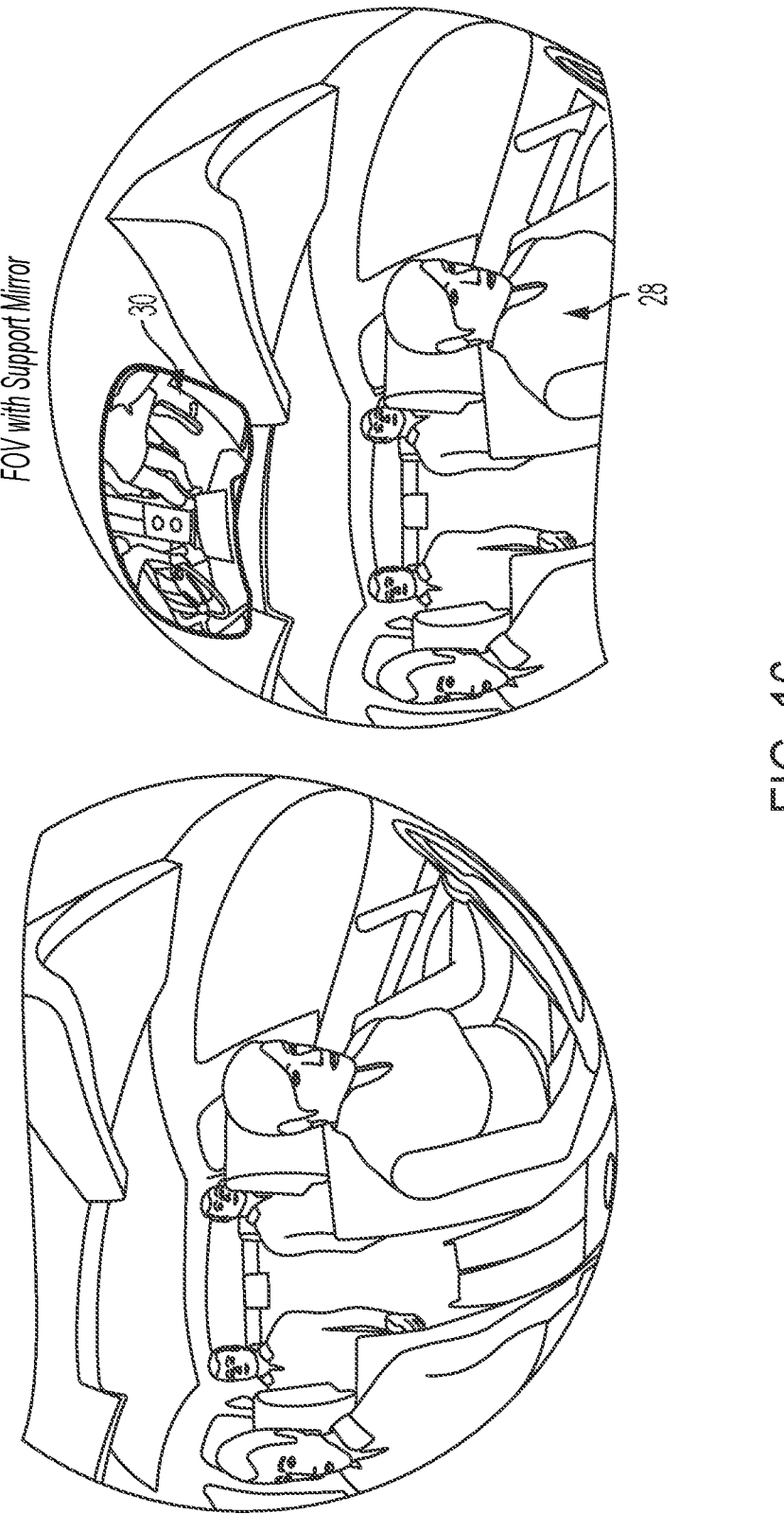
FIG. 16 compares an example image captured by a camera of a monitoring system that does not include a support mirror and an example image captured by the camera of the monitoring system including the support mirror and viewing through an electrochromic mirror reflective element of the mirror assembly.

FIG. 16 compares an example image captured by a camera of a cabin monitoring system that does not include a support mirror to an example image captured by the camera 14 of the cabin monitoring system that includes the support mirror 20. In FIG. 16, the camera 14 views through an electrochromic mirror reflective element. As shown, the primary field of view 28 of the camera 14 may be shifted vertically so as to view the support mirror 14 and thus the primary field of view 28 may include a smaller portion of the driver seat position, and the secondary field of view 30 provides the additional view of the driver lap position. Although the primary field of view 28 of the camera 14 is shifted vertically, the primary field of view 28 maintains visibility of the head region of the driver and/or passenger of the vehicle.

Figure 17:
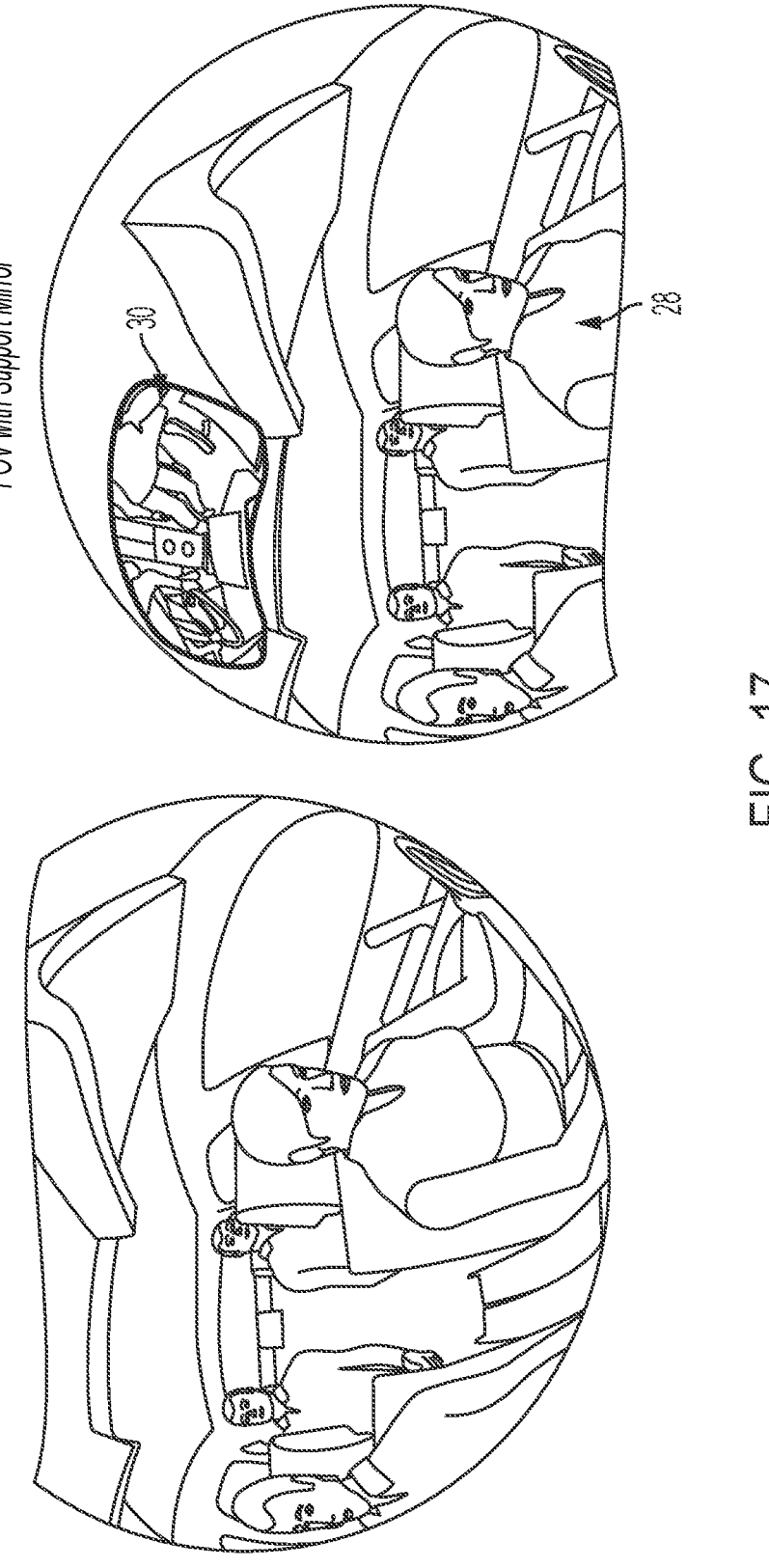
FIG. 17 compares an example image captured by a camera of a monitoring system that does not include a support mirror and an example image captured by the camera of the monitoring system including the support mirror and viewing through an prismatic mirror reflective element of the mirror assembly.

FIG. 17 compares an example image captured by a camera of a cabin monitoring system that does not include the support mirror to an example image captured by the camera 14 of the cabin monitoring system that includes the support mirror 20, where the camera 14 views through a prismatic mirror reflective element. In FIG. 17, the prismatic mirror reflective element is toggled upward to the nighttime position so that the mirror is tilted upward relative to the daytime position, and thus the camera's principal viewing axis is directed more upward than when the prismatic mirror reflective element is in the daytime position. As shown, when the position of the camera is shifted or toggled during adjustment of the prismatic mirror between the daytime mode and the nighttime mode, the support mirror 20 (and thus the secondary field of view) remains in view of the camera. Although the primary field of view 28 of the camera 14 is shifted vertically when the mirror head is toggled to the nighttime position, the primary field of view 28 maintains visibility of the head region of the driver and/or passenger of the vehicle.

Figure 18:
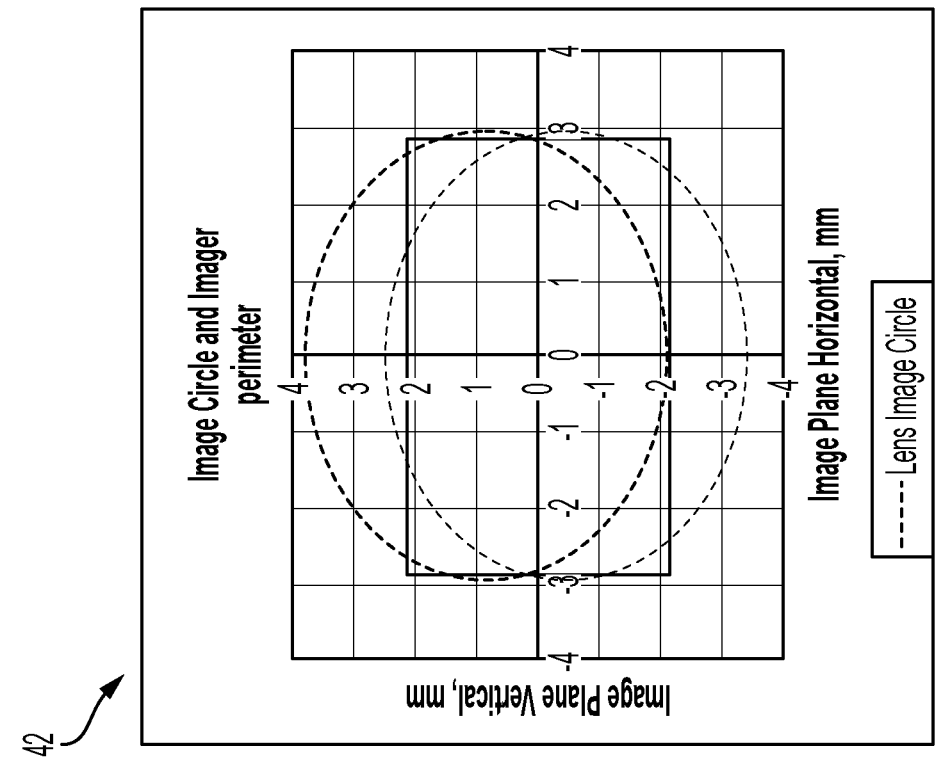
FIG. 18 is a diagram showing a vertical image shift of the image data captured by the camera.
Figure 19:
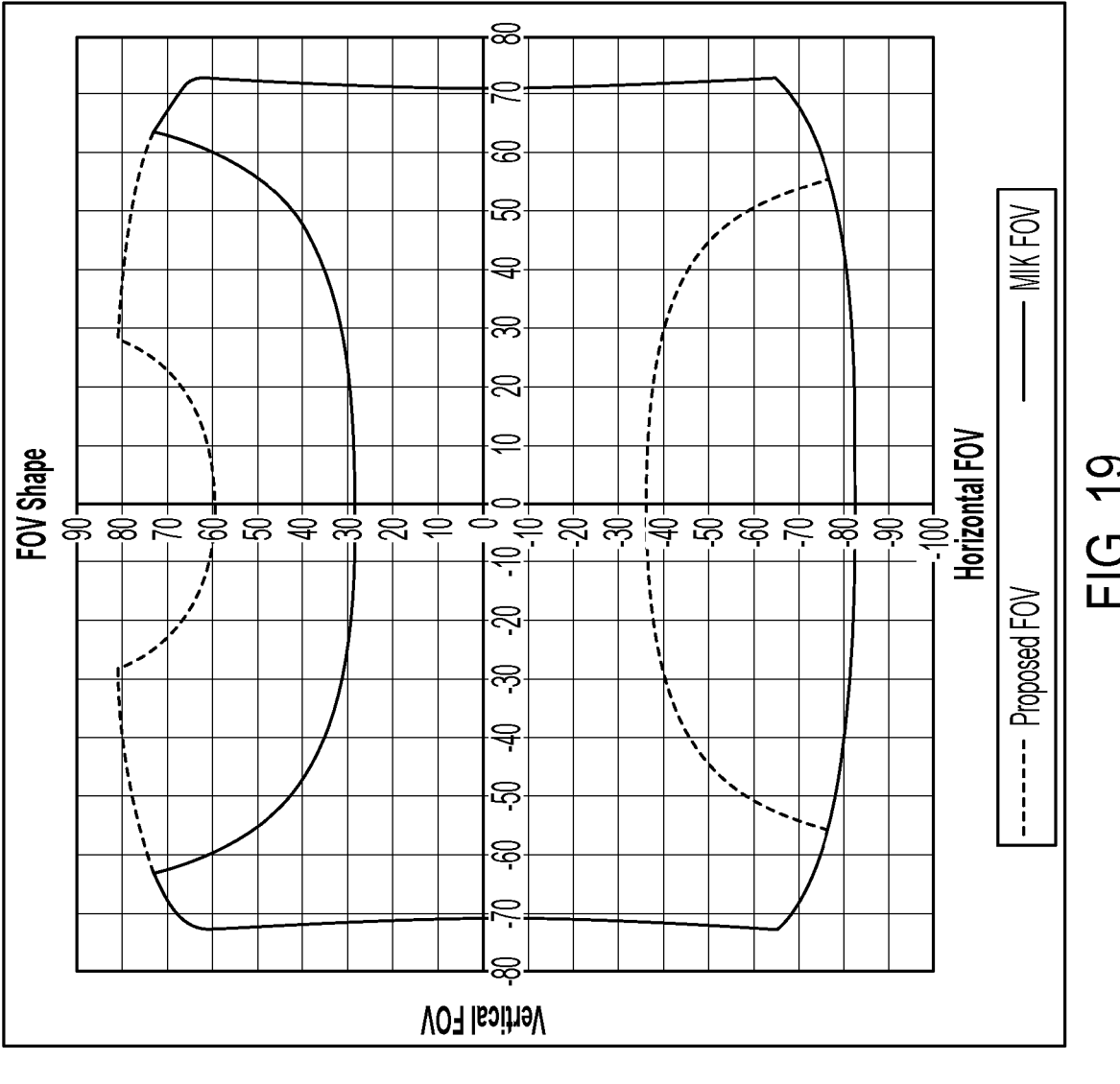
FIG. 19 is a diagram showing a shift in the field of view of the camera.

As shown in the diagram 42 of FIG. 18, the image at the reflector may be shifted vertically, such as upward by 0.82 millimeters, and thus the system may physically or digitally shift the captured image, such as downward by 0.48 millimeters. Further, the diagram 44 of FIG. 19 shows an example field of view of the camera 14 that extends upward from a viewing axis, such as by 29 degrees, and downward from the viewing axis, such as by 82 degrees. The system may physically or digitally shift the field of view, such as to more easily include the reflector 20 in the captured image data, so that the field of view extends 60 degrees upward and 36.2 degrees downward from the viewing axis of the camera. The IR LEDs at the interior rearview mirror assembly 13 and the reflector module 20 may require energy usage of about 1.7 watts per LED and the IR LEDs at the reflector 20 may provide an illumination angle of about 80 degrees. Operation of the IR LEDs at the reflector 20 may brighten the steering wheel and leg areas of the driver and passenger for the camera capturing image data representative of near IR light.

Radar technology is often seen as a viable technology to supplement a camera-based system because of its ability to cover a wide field-of-view and view through nonmetal objects. Thus, the system may include one or more radar sensors to enhance detection of objects behind the front seat (and not readily viewable by the camera). Optionally, the system may include radar-reflective elements and the monitoring system may include a radar sensor that can sense radar-reflections off the radar-reflective elements to enhance detection (such as by utilizing aspects of the systems described in U.S. Pat. No. 11,112,498, which is hereby incorporated herein by reference in its entirety). The vehicle may include a camera or sensor or light of a driver monitoring system and/or head and face direction and position tracking system and/or eye tracking system and/or gesture recognition system. Such head and face direction and/or position tracking systems and/or eye tracking systems and/or gesture recognition systems may utilize aspects of the systems described in U.S. Pat. Nos. 11,582,425; 11,518,401; 10,958,830; 10,065,574; 10,017,114; 9,405,120 and/or 7,914,187, and/or U.S. Publication Nos. US-2022-0377219; US-2022-0254132; US-2022-0242438; US-2021-0323473; US-2021-0291739; US-2020-0320320; US-2020-0202151; US-2020-0143560; US-2019-0210615; US-2018-0231976; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or International Publication Nos. WO 2023/220222; WO 2023/034956; WO 2022/241423 and/or WO 2022/187805, which are all hereby incorporated herein by reference in their entireties.

Optionally, the driver monitoring system may be integrated with a camera monitoring system (CMS) of the vehicle. The integrated vehicle system incorporates multiple inputs, such as from the inward viewing or driver monitoring camera and from the forward or outward viewing camera, as well as from a rearward viewing camera and sideward viewing cameras of the CMS, to provide the driver with unique collision mitigation capabilities based on full vehicle environment and driver awareness state. The image processing and detections and determinations are performed locally within the interior rearview mirror assembly and/or the overhead console region, depending on available space and electrical connections for the particular vehicle application. The CMS cameras and system may utilize aspects of the systems described in U.S. Publication Nos. US-2021-0245662; US-2021-0162926; US-2021-0155167; US-2018-0134217 and/or US-2014-0285666, and/or International Publication No. WO 2022/150826, which are all hereby incorporated herein by reference in their entireties.

The ECU may receive image data captured by a plurality of cameras of the vehicle, such as by a plurality of surround view system (SVS) cameras and a plurality of camera monitoring system (CMS) cameras and optionally one or more driver monitoring system (DMS) cameras. The ECU may comprise a central or single ECU that processes image data captured by the cameras for a plurality of driving assist functions and may provide display of different video images to a video display screen in the vehicle (such as at an interior rearview mirror assembly or at a central console or the like) for viewing by a driver of the vehicle. The system may utilize aspects of the systems described in U.S. Pat. Nos. 10,442,360 and/or 10,046,706, and/or U.S. Publication Nos. US-2021-0245662; US-2021-0162926; US-2021-0155167 and/or US-2019-0118717, and/or International Publication No. WO 2022/150826, which are all hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. A vehicular cabin monitoring system, the vehicular cabin monitoring system comprising:

a camera disposed at an interior cabin of a vehicle equipped with the vehicular cabin monitoring system, wherein the camera views at least the head of a driver of the vehicle that is present in the interior cabin of the vehicle, and wherein the camera is operable to capture image data;

wherein the camera is accommodated by a mirror head of an interior rearview mirror assembly of the vehicle, the mirror head accommodating a mirror reflective element:

an electronic control unit (ECU);

wherein image data captured by the camera is transferred to the ECU;

wherein the ECU comprises electronic circuitry and associated software, and wherein the electronic circuitry comprises an image processor operable to process image data captured by the camera;

wherein a first subset of the image data captured by the camera is representative of the head of the driver, and wherein at least the first subset of the image data captured by the camera is processed at the ECU for monitoring of the driver of the vehicle;

a plurality of spectrally reflecting mirror elements disposed within the interior cabin of the vehicle, wherein each spectrally reflecting mirror element of the plurality of spectrally reflecting mirror elements spectrally reflects light toward the camera that is representative of at least a portion of light incident at a respective obstructed region within the interior cabin of the vehicle, and wherein each respective obstructed region within the interior cabin of the vehicle is remote from the head of the driver and is not directly viewed by the camera;

wherein the camera (i) directly views the head of the driver and (ii) directly views at least one spectrally reflecting mirror element of the plurality of spectrally reflecting mirror elements;

wherein a second subset of the image data captured by the camera is representative of light reflected from the at least one spectrally reflecting mirror element of the plurality of spectrally reflecting mirror elements directly viewed by the camera, and wherein the second subset of the image data captured by the camera is different from the first subset of the image data captured by the camera wherein the vehicular cabin monitoring system, based on processing at the ECU of image data captured by the camera, and based at least in part on a determined position of the at least one spectrally reflecting mirror element of the plurality of spectrally reflecting mirror elements within the captured image data, determines an orientation of the mirror head relative to the head of the driver within the interior cabin of the vehicle; and wherein the vehicular cabin monitoring system, based on processing at the ECU of at least the second subset of the image data captured by the camera, determines presence of an object within the respective obstructed region within the interior cabin of the vehicle.

2. The vehicular cabin monitoring system of claim 1, wherein the plurality of spectrally reflecting mirror elements include at least one selected from the group consisting of (i) at least one spectrally reflecting flat mirror element, (ii) at least one spectrally reflecting convex mirror element and (iii) at least one spectrally reflecting freeform mirror element.

3. The vehicular cabin monitoring system of claim 1, wherein at least one spectrally reflecting mirror element of the plurality of spectrally reflecting mirror elements is positioned on a B-pillar of the vehicle.

4. The vehicular cabin monitoring system of claim 1, wherein at least one spectrally reflecting mirror element of the plurality of spectrally reflecting mirror elements is positioned on a C-pillar of the vehicle.

5. The vehicular cabin monitoring system of claim 1, wherein at least one spectrally reflecting mirror element of the plurality of spectrally reflecting mirror elements is positioned on a D-pillar of the vehicle.

6. The vehicular cabin monitoring system of claim 1, wherein at least one spectrally reflecting mirror element of the plurality of spectrally reflecting mirror elements is positioned proximate to a ceiling portion of the vehicle.

7. The vehicular cabin monitoring system of claim 1, wherein, based on the determined orientation of the mirror head relative to the head of the driver within the interior cabin of the vehicle, and based on a stored orientation of the mirror head relative to the head of the driver within the interior cabin of the vehicle, a memory mirror head positioning system of the interior rearview mirror assembly adjusts the orientation of the mirror head.

8. The vehicular cabin monitoring system of claim 1, wherein the camera views through the mirror reflective element accommodated by the mirror head of the interior rearview mirror assembly.

9. The vehicular cabin monitoring system of claim 1, wherein the ECU is disposed at the interior rearview mirror assembly.

10. The vehicular cabin monitoring system of claim 1, wherein the camera is operable to capture image data representative of near infrared light (near IR light) within the interior cabin of the vehicle, and wherein a near IR light emitter is disposed within the interior cabin of the vehicle, and wherein the near IR light emitter is operable, when electrically powered, to emit near IR light.

11. The vehicular cabin monitoring system of claim 10, wherein the near IR light emitter, when the near IR light emitter is electrically powered, illuminates at least the head of the driver within the interior cabin of the vehicle.

12. The vehicular cabin monitoring system of claim 10, wherein the near IR light emitter, when the near IR light emitter is electrically powered, illuminates at least the respective obstructed region within the interior cabin of the vehicle.

13. The vehicular cabin monitoring system of claim 10, wherein the plurality of spectrally reflecting mirror elements are respectively configured to reflect at a least a portion of visible light incident at the respective spectrally reflecting mirror element and to reflect at least a portion of near IR light incident at the respective spectrally reflecting mirror element.

14. The vehicular cabin monitoring system of claim 10, wherein the near IR light emitter is disposed at or near the at least one spectrally reflecting mirror element of the plurality of spectrally reflecting mirror elements, and wherein the camera captures image data representative of near IR light reflected from the at least one spectrally reflecting mirror element of the plurality of spectrally reflecting mirror elements.

15. The vehicular cabin monitoring system of claim 1, wherein the camera is operable to capture image data representative of near infrared light (near IR light) within the interior cabin of the vehicle, and wherein the camera is accommodated by a mirror head of an interior rearview mirror assembly of the vehicle, and wherein a first near IR light emitter is accommodated by the mirror head, and wherein a second near IR light emitter is disposed at or near the at least one spectrally reflecting mirror element of the plurality of spectrally reflecting mirror elements.

16. The vehicular cabin monitoring system of claim 15, wherein a near IR light photodetector is disposed at or near the at least one spectrally reflecting mirror element of the plurality of spectrally reflecting mirror elements, and wherein the second near IR light emitter is electrically powered based on detection at the near IR light photodetector of a level of near IR light that is greater than a threshold level of near IR light.

17. The vehicular cabin monitoring system of claim 1, wherein the plurality of spectrally reflecting mirror elements are disposed within the interior cabin of the vehicle remote from one another, and wherein, based on light reflected from two or more spectrally reflecting mirror elements of the plurality of spectrally reflecting mirror elements, the camera views two or more respective obstructed regions within the interior cabin of the vehicle.

18. The vehicular cabin monitoring system of claim 1, wherein the camera comprises an imaging array having at least one million photosensors arranged in rows and columns, and wherein the second subset of the image data captured by the camera corresponds to less than or equal to 10 percent of the at least one million photosensors.

19. The vehicular cabin monitoring system of claim 18, wherein the imaging array has at least five million photosensors arranged in rows and columns, and wherein the second subset of the image data captured by the camera corresponds to less than or equal to 400,000 photosensors of the at least five million photosensors.

20. A vehicular cabin monitoring system, the vehicular cabin monitoring system comprising:

a camera disposed at an interior cabin of a vehicle equipped with the vehicular cabin monitoring system, wherein the camera views at least the head of a driver of the vehicle that is present in the interior cabin of the vehicle, and wherein the camera is operable to capture image data;

wherein the camera is accommodated by a mirror head of an interior rearview mirror assembly of the vehicle, the mirror head accommodating a mirror reflective element;

wherein the camera is operable to capture image data representative of near infrared light (near IR light) within the interior cabin of the vehicle;

wherein a near IR light emitter is disposed within the interior cabin of the vehicle, and wherein the near IR light emitter is operable, when electrically powered, to emit near IR light to illuminate at least a portion of the interior cabin of the vehicle that is viewed by the camera;

an electronic control unit (ECU);

wherein image data captured by the camera is transferred to the ECU;

wherein the ECU comprises electronic circuitry and associated software, and wherein the electronic circuitry comprises an image processor operable to process image data captured by the camera;

wherein a first subset of the image data captured by the camera is representative of the head of the driver, and wherein at least the first subset of the image data captured by the camera is processed at the ECU for monitoring of the driver of the vehicle;

a plurality of spectrally reflecting mirror elements disposed within the interior cabin of the vehicle, wherein each spectrally reflecting mirror element of the plurality of spectrally reflecting mirror elements spectrally reflects light toward the camera that is representative of at least a portion of light incident at a respective obstructed region within the interior cabin of the vehicle, and wherein each respective obstructed region within the interior cabin of the vehicle is remote from the head of the driver and is not directly viewed by the camera;

wherein a second subset of the image data captured by the camera is representative of light reflected from at least one spectrally reflecting mirror element of the plurality of spectrally reflecting mirror elements, and wherein the second subset of the image data captured by the camera is different from the first subset of the image data captured by the camera;

wherein the vehicular cabin monitoring system, based on processing at the ECU of image data captured by the camera, and based at least in part on a determined position of the at least one spectrally reflecting mirror element of the plurality of spectrally reflecting mirror elements within the captured image data, determines an orientation of the mirror head relative to the head of the driver within the interior cabin of the vehicle;

wherein the plurality of spectrally reflecting mirror elements are disposed within the interior cabin of the vehicle remote from one another, and wherein, based on light reflected from two or more spectrally reflecting mirror elements of the plurality of spectrally reflecting mirror elements, the camera views two or more respective obstructed regions within the interior cabin of the vehicle; and wherein the vehicular cabin monitoring system, based on processing at the ECU of at least the second subset of the image data captured by the camera, determines presence of an object within at least one respective obstructed region within the interior cabin of the vehicle.

21. The vehicular cabin monitoring system of claim 20, wherein the vehicular cabin monitoring system, based on processing at the ECU of image data captured by the camera, and based at least in part on a determined position of the at least one spectrally reflecting mirror element of the plurality of spectrally reflecting mirror elements within the captured image data, determines an orientation of the mirror head relative to the head of the driver within the interior cabin of the vehicle.

22. The vehicular cabin monitoring system of claim 20, wherein the near IR light emitter, when the near IR light emitter is electrically powered, illuminates at least the head of the driver within the interior cabin of the vehicle.

23. The vehicular cabin monitoring system of claim 20, wherein the plurality of spectrally reflecting mirror elements are respectively configured to reflect at least a portion of visible light incident at the respective spectrally reflecting mirror element and to reflect at least a portion of near IR light incident at the respective spectrally reflecting mirror element.

24. A vehicular cabin monitoring system, the vehicular cabin monitoring system comprising:

a camera disposed at an interior cabin of a vehicle equipped with the vehicular cabin monitoring system, wherein the camera views at least the head of a driver of the vehicle that is present in the interior cabin of the vehicle, and wherein the camera is operable to capture image data;

wherein the camera is accommodated by a mirror head of an interior rearview mirror assembly of the vehicle, and wherein the mirror head accommodates a mirror reflective element, and wherein the camera comprises an imaging array having at least five million photosensors arranged in rows and columns;

an electronic control unit (ECU) disposed at the interior rearview mirror assembly;

wherein image data captured by the camera is transferred to the ECU;

wherein the ECU comprises electronic circuitry and associated software, and wherein the electronic circuitry comprises an image processor operable to process image data captured by the camera;

wherein a first subset of the image data captured by the camera is representative of the head of the driver, and wherein at least the first subset of the image data captured by the camera is processed at the ECU for monitoring of the driver of the vehicle;

a plurality of spectrally reflecting mirror elements disposed within the interior cabin of the vehicle, wherein each spectrally reflecting mirror element of the plurality of spectrally reflecting mirror elements spectrally reflects light toward the camera that is representative of at least a portion of light incident at a respective obstructed region within the interior cabin of the vehicle, and wherein each respective obstructed region within the interior cabin of the vehicle is remote from the head of the driver and is not directly viewed by the camera;

wherein a second subset of the image data captured by the camera is representative of light reflected from at least one spectrally reflecting mirror element of the plurality of spectrally reflecting mirror elements, and wherein the second subset of the image data captured by the camera is different from the first subset of the image data captured by the camera, and wherein the second subset of the image data captured by the camera corresponds to less than or equal to 400,000 photosensors of the at least five million photosensors;

wherein the vehicular cabin monitoring system, based on processing at the ECU of image data captured by the camera, and based at least in part on a determined position of the at least one spectrally reflecting mirror element of the plurality of spectrally reflecting mirror elements within the captured image data, determines an orientation of the mirror head relative to the head of the driver within the interior cabin of the vehicle; and wherein the vehicular cabin monitoring system, based on processing at the ECU of at least the second subset of the image data captured by the camera, determines presence of an object within the respective obstructed region within the interior cabin of the vehicle.

25. The vehicular cabin monitoring system of claim 24, wherein the camera views through the mirror reflective element accommodated by the mirror head of the interior rearview mirror assembly.

26. The vehicular cabin monitoring system of claim 24, wherein the camera is operable to capture image data representative of near infrared light (near IR light) within the interior cabin of the vehicle, and wherein a near IR light emitter is disposed within the interior cabin of the vehicle, and wherein the near IR light emitter is operable, when electrically powered, to emit near IR light.

27. The vehicular cabin monitoring system of claim 26, wherein the plurality of spectrally reflecting mirror elements are respectively configured to reflect at a least a portion of visible light incident at the respective spectrally reflecting mirror element and to reflect at least a portion of near IR light incident at the respective spectrally reflecting mirror element.

28. The vehicular cabin monitoring system of claim 24, wherein the plurality of spectrally reflecting mirror elements are disposed within the interior cabin of the vehicle remote from one another, and wherein, based on light reflected from two or more spectrally reflecting mirror elements of the plurality of spectrally reflecting mirror elements, the camera views two or more respective obstructed regions within the interior cabin of the vehicle.

* * * * *